United States Patent
Kyota et al.

(10) Patent No.: US 7,706,658 B2
(45) Date of Patent: Apr. 27, 2010

(54) COPOLYMER AND POLYMERIZABLE COMPOSITION

(75) Inventors: Hirokazu Kyota, Kanagawa (JP); Hiroki Sasaki, Shizuoka (JP); Toshihide Yoshitani, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 110 days.

(21) Appl. No.: 11/994,002

(22) PCT Filed: Jul. 5, 2006

(86) PCT No.: PCT/JP2006/313802
§ 371 (c)(1),
(2), (4) Date: Dec. 27, 2007

(87) PCT Pub. No.: WO2007/004743
PCT Pub. Date: Jan. 11, 2007

(65) Prior Publication Data
US 2009/0116808 A1    May 7, 2009

(30) Foreign Application Priority Data

| Jul. 5, 2005 | (JP) | .............................. 2005-196878 |
| Jul. 5, 2005 | (JP) | .............................. 2005-196879 |
| Jul. 5, 2005 | (JP) | .............................. 2005-196880 |

(51) Int. Cl.
*G02B 6/00*   (2006.01)
*C08G 77/04*  (2006.01)
*C08L 83/06*  (2006.01)

(52) U.S. Cl. .......................... 385/141; 528/26; 525/100
(58) Field of Classification Search ................ 525/100; 528/26; 385/141
See application file for complete search history.

(56) References Cited

U.S. PATENT DOCUMENTS 4,933,406 A * 6/1990 Anan et al. ................. 526/245

FOREIGN PATENT DOCUMENTS

| JP | 62-235919 A | 10/1987 |
| JP | 02-220022 A | 9/1990 |
| JP | 02-230115 A | 9/1990 |
| JP | 04-168415 A | 6/1992 |
| JP | 08-334732 A | 12/1996 |
| JP | 2001-108949 A | 4/2001 |

* cited by examiner

*Primary Examiner*—Daniel Petkovsek
(74) *Attorney, Agent, or Firm*—Sughrue Mion, PLLC

(57) ABSTRACT

A copolymer containing a repeating unit of formula (1) and a repeating unit of formula (2-1) or (2-2):

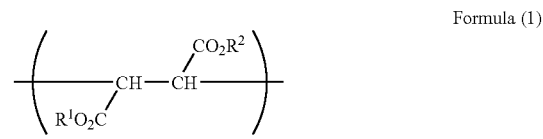

Formula (1)

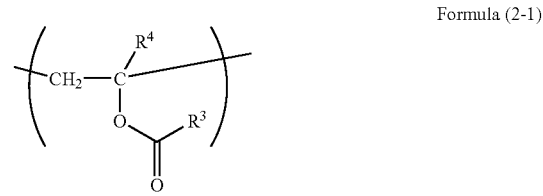

Formula (2-1)

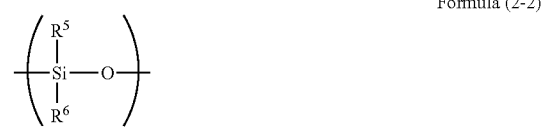

Formula (2-2)

wherein $R^1$ and $R^2$ represent alkyl or aryl, $R^3$ represents alkyl, aryl, alkoxy or amino, $R^5$ and $R^6$ represent hydrogen, alkyl or aryl. The copolymer exhibits excellent mechanical properties, and capable of forming a coating film having low reflectivity.

22 Claims, No Drawings

COPOLYMER AND POLYMERIZABLE COMPOSITION

FIELD OF THE INVENTION

The present invention relates to a copolymer having narrow molecular weight distribution and excellent mechanical properties, and capable of forming a coating film having a sufficient low reflectivity, its production method, and a polymerizable composition for forming the polymer. Further, it relates to a polymerizable composition, an optical material (in particular, a polymerizable composition, a curing resin composition, an antireflective film, a polarizing plate and an image display), and an optical waveguide (in particular, a plastic optical fiber (POF)), using the polymer.

BACKGROUND OF THE INVENTION

Polymer materials excellent in low hygroscopic property, transparency and heat resistance are required in the technical field of plastic optical members, and as one of polymer materials capable of satisfying those, a fumaric acid dialkyl ester polymer is known (for example, JP-A-62-169807 and J. Macromol. Sci., A25 (5-7), 537-554 (1988)). Fumaric acid dialkyl ester is a rare monomer that radically polymerizes, even though it is 1, 2 disubstituted ethylene, and a polymer obtained therefrom has extremely high heat resistance. However, there was the disadvantage that its homopolymer is a polymer that steric hindrance is too high, so that it is difficult to increase a molecular weight (at most about 100,000), and further, it is rigid and is liable to be a rod-shape, so that mechanical strength (for example, tensile strength) is weak, resulting in a brittle polymer.

To improve this disadvantage, a copolymer with an alkyl vinyl ether is proposed (JP-A-2000-143741). However, mechanical strength of the copolymer is not sufficient. Further, an example of a copolymer of a fumaric acid dialkyl ester with a monomer such as styrene or acrylonitrile is reported (Journal of Polymer Science: Part A: Vol. 30, 1559 (1992)), but mechanical strength, hygroscopic property and the like are not referred to.

On the other hand, an antireflective film generally prevents contrast from decreasing due to reflection of outside light or prevents an image from reflecting, in displays such as cathode ray tube displays (CRT), plasma displays (PDP), electroluminescence displays (ELD) and liquid crystal displays (LCD), and therefore is provided on the outermost surface of displays in order to reduce reflectivity using principle of optical interference.

Such an antireflective film can generally be produced by forming a low reflective index layer having an appropriate thickness and having a refractive index lower than that of a support on the support. To realize a low refractive index, a material having a refractive index as low as possible is desired for the low refractive index layer. Further, the antireflective film is required to have high mar resistance in order to use the same on the outermost surface of a display. For example, in a thin film of about 100 nm, in order to realize high mar resistance, strength of a coating film itself and adhesion to a lower layer are required.

To decrease refractive index of a material, means of (1) introducing fluorine atoms, and (2) decreasing density (introducing voids) are known. However, either of those means have the tendency that coating film strength or adhesion at interface decreases, resulting in deterioration of mar resistance, and low refractive index and high mar resistance were not achieved in combination.

As a method of increasing coating film strength, there is a method of using a fluorine-containing sol gel film as described in JP-A-2002-265866 and JP-A-2002-317152. In this method, however, there are great restrictions that (1) long-term heating is required for curing, and load of production is large; (2) there is no resistance to saponification liquid (alkali treatment liquid), and in the case of saponification treating a plastic film surface, the treatment cannot be carried out after film formation of an antireflective film; and the like.

On the other hand, JP-A-11-189621, JP-A-11-228631 and JP-A-2000-313709 describe means of improving mar resistance by introducing a polysiloxane structure in a fluorine-containing copolymer to decrease a friction coefficient of coating film surface. This means is effective to improvement of mar resistance to a certain extent, but sufficient mar resistance is not obtained for coating films lacking in substantial coating film strength and interfacial adhesion.

Further, WO 2004-017105 pamphlet describes means of improving mar resistance by using a fluorine-containing copolymer and inorganic fine particles in combination to improve coating film strength and interfacial adhesion. In this means, however, it was found that there is the case that inorganic fine particles are not sufficiently dispersed in a matrix of the fluorine-containing copolymer, crude density of inorganic fine particles causes in the coating film, and haze rises. This problem is particularly problematic in a smooth surface low reflective film having no antiglare property.

Further, plastic optical members have the advantage that production and processing are easy, and other advantages, as compared with quartz-based optical members having the same structure, and various applications such as optical waveguides are recently attempted. In particular, plastic optical fibers (POF) have the disadvantage that because element wires are all constituted of a plastic, transmission loss is relatively large as compared with quartz types, but have the advantages that they have good flexibility, are lightweight, have good processability, and are easily produced as fibers having large bore diameter as compared with quartz-based optical fibers.

As materials for optical fibers, polymethyl methacrylate (PMMA) that is inexpensive and is easily processed is widely used. However, because of a polymer having high water absorbing property, the polymer has poor moisture resistance and can only be used in the limited uses. As means to improve moisture resistance, it is an effective means to introduce fluorine atoms. However, it is difficult to establish high glass transition temperature (Tg), that is, heat resistance, in combination with the moisture resistance. For example, poly(2,2,2-trifluoroethyl methacrylate) in which methyl groups in side chains of PMMA are merely changed fluorine-containing alkyl groups decreases Tg, and POF using this has very poor heat resistance. One of means to solve this problem is all fluorine polymer (TEFLON, registered trademark, AF amorphous fluoropolymer, John Scheires, 1997, Modern Fluoropolymers, p 397-398, John Willwy & Sons Ltd.), and this is an excellent material satisfying various performances such as heat resistance, low hygroscopic property, low transmission loss and the like. However, synthesis of a perfluorinated (diene) monomer that is a raw material of this polymer is very complicated, and there is the problem that cost of a polymer is high.

SUMMARY OF THE INVENTION

A first object of the invention is to provide a copolymer that maintains heat resistance possessed by a fumarate structure, is made to have low hygroscopic property by introducing fluorine atoms, has excellent mechanical strength, and also has excellent transparency.

A second object of the invention is to provide the copolymer having excellent antireflective film formation, that can form a coating film having a sufficient low reflectivity.

Further, a third object of the invention is to provide an antireflective film having improved mar resistance while maintaining sufficient antireflectivity. In particular, the object is to provide a polarizing plate or a display using such an antireflective film.

A fourth object of the invention is to provide an optical waveguide being flexible and having low transmission loss, particularly an optical fiber (POF), by using a polymer excellent in all of low hygroscopic property (moisture resistance), heat resistance (high Tg), mechanical strength (elastic modulus and tensile strength) and transparency, and that can easily be produced.

Specifically, means for solving the above problems are as follows.

1. A copolymer containing a repeating unit represented by the following formula (1), and at least one of a repeating unit represented by the following formula (2-1) and a repeating unit represented by the following formula (2-2).

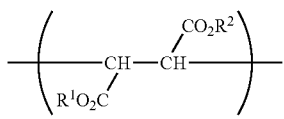

Formula (1)

In the formula (1), $R^1$ and $R^2$ represent an alkyl group or an aryl group, provided that at least one of $R^1$ and $R^2$ contains a fluorine atom and $R^1$ and $R^2$ are not an alkyl group containing a group represented by $-(CX_2)_n-X$ in which X is a halogen atom and n is an integer of 7 or more.

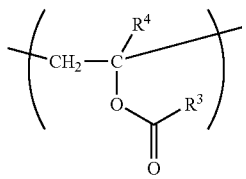

Formula (2-1)

In the formula (2-1), $R^3$ represents an alkyl group, an aryl group, an alkoxy group or an amino group (which may be an anilino group), and $R^4$ represents an alkyl group.

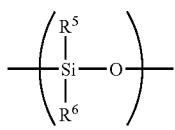

Formula (2-2)

In the formula (2-2), $R^5$ and $R^6$ each represent a hydrogen atom, an alkyl group or an aryl group.

2. The copolymer as described in (1), containing the repeating unit represented by the formula (1) wherein at least one of $R^1$ and $R^2$ is an alkyl group having from 2 to 6 carbon atoms and a fluorine atom, or an aryl group containing a fluorine atom, and the repeating unit represented by the formula (2-1).

3. The copolymer as described in (1), containing the repeating unit represented by the formula (1) wherein at least one of $R^1$ and $R^2$ is an alkyl group having from 2 to 6 carbon atoms and a fluorine atom, and the repeating unit represented by the formula (2-1)

4. The copolymer as described in (2) or (3), wherein $R^3$ and $R^4$ in the formula (2-1) are a methyl group.

5. The copolymer as described in any one of (1) to (4), containing the repeating unit represented by the formula (1) and the repeating unit represented by the formula (2-1) in an amount of 30 mol % or more, respectively.

6. The copolymer as described in (1), containing the repeating unit represented by the formula (1) and the repeating unit represented by the formula (2-2).

7. The copolymer as described in (1), containing the repeating unit represented by the formula (1), the repeating unit represented by the formula (2-1) and the repeating unit represented by the formula (2-2).

8. The copolymer as described in (7), containing 20 mol % or more of the repeating unit represented by the formula (1), 0.05 mol % or more of the repeating unit represented by the formula (2-2), and 20 mol % or more of the repeating unit represented by the formula (2-1).

9. The copolymer as described in any one of (6) to (8), wherein at least one of $R^1$ and $R^2$ in the formula (1) is an alkyl group having from 2 to 6 carbon atoms and a fluorine atom, or an aryl group containing a fluorine atom.

10. The copolymer as described in any one of (7) to (9), wherein $R^3$ and $R^4$ in the formula (2-1) are a methyl group.

11. The copolymer as described in any one of (1) to (10), having a number average molecular weight (Mn) of from 1,000 to 1,000,000.

12. The copolymer as described in any one of (1) to (11), having a weight average molecular weight (Mw) of from 2,000 to 1,000,000.

13. The copolymer as described in any one of (1) to (12), having Mw/Mn of 2 or less.

14. A polymerizable composition containing a compound represented by the following formula (3), and at least one of a compound represented by the following formula (4) and a polysiloxane-containing compound.

Formula (3)

In the formula (3), $R^1$ and $R^2$ represent an alkyl group or an aryl group, provided that at least one of $R^1$ and $R^2$ contains a fluorine atom and $R^1$ and $R^2$ are not an alkyl group containing a group represented by $-(CX_2)_n-X$ in which X is a halogen atom and n is an integer of 7 or more.

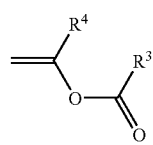

Formula (4)

In the formula (4), $R^3$ represents an alkyl group, an aryl group, an alkoxy group or an amino group (which may be an anilino group), and $R^4$ represents an alkyl group.

15. The polymerizable composition as described in (14), containing the compound represented by the formula (3) wherein at least one of $R^1$ and $R^2$ is an alkyl group having from 2 to 6 carbon atoms and a fluorine atom, or an aryl group containing a fluorine atom, and the compound represented by the formula (4).

16. The polymerizable composition as described in (14), containing the compound represented by the formula (3) wherein at least one of $R^1$ and $R^2$ is an alkyl group having from 2 to 6 carbon atoms and a fluorine atom, and the compound represented by the formula (4).

17. The polymerizable composition as described in (15) or (16), containing the compound represented by the formula (4) wherein $R^3$ and $R^4$ is a methyl group.

18. The polymerizable composition as described in (14), containing the compound represented by the formula (3), and the polysiloxane-containing compound.

19. The polymerizable composition as described in (14), containing the compound represented by the formula (3), the compound represented by the formula (4), and the polysiloxane-containing compound.

20. The polymerizable composition as described in (18) or (19), wherein at least one of $R^1$ and $R^2$ in the formula (3) is an alkyl group having from 2 to 6 carbon atoms and a fluorine atom, or an aryl group containing a fluorine atom.

21. The polymerizable composition as described in (19) or (20), containing the compound represented by the formula (4) wherein $R^3$ and $R^4$ in the formula (4) are a methyl group.

22. The polymerizable composition as described in any one of (14) to (21), which is a curing polymerizable composition.

23. A curing resin composition containing the copolymer as described in any one of (1) to (13), and a solvent.

24. A curing resin composition containing the copolymer as described in any one of (6) to (10), and a solvent.

25. A cured film made from the curing resin composition as described in (23) or (24).

26. An antireflective film having a low refractive index layer comprising a cured film made from the curing resin composition as described in (23) or (24).

27. A polarizing plate having a polarizer and a protective film provided on at least one side of the polarizer, the protective film being the antireflective film as described in (26).

28. An image display having the antireflective film as described in (26).

29. An optical waveguide containing the copolymer as described in any one of (1) to (13).

30. An optical waveguide containing a repeating unit represented by the following formula (1), and a repeating unit represented by the following formula (2-1).

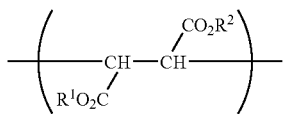

Formula (1)

In the formula (1), $R^1$ and $R^2$ represent an alkyl group or an aryl group, provided that at least one of $R^1$ and $R^2$ contains a fluorine atom and $R^1$ and $R^2$ are not an alkyl group containing a group represented by $-(CX_2)_n-X$ in which X is a halogen atom and n is an integer of 7 or more.

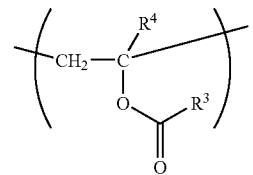

Formula (2-1)

In the formula (2-1), $R^3$ represents an alkyl group, an aryl group, an alkoxy group or an amino group (which may be an anilino group), and $R^4$ represents an alkyl group.

31. The optical waveguide as described in (29) or (39), which is an optical fiber.

32. A method of producing a copolymer, including polymerizing a compound represented by the following formula (3), and at least one of a compound represented by the following formula (4) and a polysiloxane-containing compound.

Formula (3)

In the formula (3), $R^1$ and $R^2$ represent an alkyl group or an aryl group, provided that at least one of $R^1$ and $R^2$ contains a fluorine atom and $R^1$ and $R^2$ are not an alkyl group containing a group represented by $-(CX_2)_n-X$ in which X is a halogen atom and n is an integer of 7 or more.

Formula (4)

In the formula (4), $R^3$ represents an alkyl group, an aryl group, an alkoxy group or an amino group (which may be an anilino group), and $R^4$ represents an alkyl group.

33. The method of producing a copolymer as described in (32), including polymerizing the compound represented by the formula (3) wherein at least one of $R^1$ and $R^2$ is an alkyl group having from 2 to 6 carbon atoms and a fluorine atom, or an aryl group containing a fluorine atom, and the compound represented by the formula (4).

34. The method of producing a copolymer as described in (32), including polymerizing the compound represented by the formula (3) and the polysiloxane-containing compound.

35. The method of producing a copolymer as described in (32), including polymerizing the compound represented by the formula (3), the compound represented by the formula (4) and the polysiloxane-containing compound.

DETAILED DESCRIPTION OF THE INVENTION

The invention is described in detail below.

In the present description, the numerical range expressed by the wording "a number to another number" means a range that falls between the former number indicating the lowermost limit of the range and the latter number indicating the uppermost limit thereof. Further, the descriptions of "a copolymer containing repeating units A and B", "a copolymer formed by polymerizing monomers A and B", and the like mean that the copolymer may consists of A or B alone, may contain both A and B, or may further contain other component.

Further, in the present description, "carbon atom number" in each "group" means the number including the number of carbon atoms of substituents where the group has a substituent.

The copolymer of the invention is described.

The copolymer of the invention is a copolymer containing a repeating unit represented by the following formula (1), and at least one of a repeating unit represented by the following formula (2-1) and a repeating unit represented by the following formula (2-2).

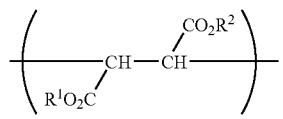

Formula (1)

In the formula (1), $R^1$ and $R^2$ represent an alkyl group or an aryl group, provided that at least one of $R^1$ and $R^2$ contains a fluorine atom and $R^1$ and $R^2$ are not an alkyl group containing a group represented by $-(CX_2)_n-X$ in which X is a halogen atom and n is an integer of 7 or more.

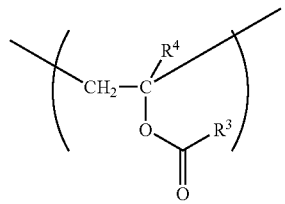

Formula (2-1)

In the formula (2-1), $R^3$ represents an alkyl group, an aryl group, an alkoxy group or an amino group (which may be an anilino group), and $R^4$ represents an alkyl group.

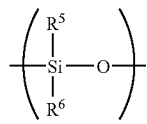

Formula (2-2)

In the formula (2-2), $R^5$ and $R^6$ each represent a hydrogen atom, an alkyl group or an aryl group.

(Copolymer of Type A)

A preferable first embodiment of the copolymer of the invention is a copolymer (type A) containing the repeating unit represented by the formula (1) and the repeating unit represented by the formula (2-1).

In the formula (1), $R^1$ and $R^2$ each represent an alkyl group or an aryl group.

The alkyl group may be any of linear, branched or cyclic form. The alkyl group has preferably from 1 to 10, and more preferably from 1 to 6, carbon atoms. Specific examples of the alkyl group include a methyl group, an ethyl group, an isopropyl group, a tert-butyl group, a benzyl group, and a cyclohexyl group.

On the other hand, the aryl group has preferably from 1 to 8 carbon atoms. Specific examples of the aryl group include a phenyl group and a p-tolyl group.

It is preferable that at least one of $R^1$ and $R^2$ is an alkyl group having from 2 to 6 carbon atoms and a fluorine atom (for example, 2,2,2-trifluoroethyl group, 2,2,3,3-tetrafluoropropyl group, 2,2,3,3,3-pentafluoropropyl group, 2,2,3,3,4,4,5,5-octafluoropentyl group, and 1-trifluoromethyl-2,2,2-trifluoroethyl group (hexafluoroisopropyl group) are exemplified), or an aryl group containing a fluorine atom (for example, pentafluorophenyl group).

It is preferable that $R^1$ and $R^2$ each are an alkyl group having from 1 to 6 carbon atoms, and it is more preferable that each is a linear or branched alkyl group having from 1 to 6 carbon atoms.

As described hereinafter, $R^1$ and $R^2$ may be substituted with a substituent, but it is preferable that at least one of those is substituted with a fluorine atom.

When $R^1$ and $R^2$ are an alkyl group, the alkyl group containing the group represented by $-(CX_2)_n-X$ (X is a halogen atom, and n is an integer of 7 or more) is excluded. Where n is more than 7, crystallizability develops, and it becomes not suitable for optical uses.

In a ratio of the total hydrogen atom number and fluorine atom number contained in $R^1$ and $R^2$, it is preferable that the fluorine atom number is half or more of the hydrogen atom number, and it is more preferable that the fluorine atom number is larger than the hydrogen atom number.

In the formula (2-1), $R^3$ represents an alkyl group, an aryl group, an alkoxy group or an amino group (which may be an anilino group).

When $R^3$ is an alkyl group, the alkyl group may be any of linear, branched or cyclic form. Linear or cyclic form is preferable, and linear form is more preferable. The alkyl group has preferably from 1 to 6, and more preferably from 1 to 3, carbon atoms. Examples of the preferable alkyl group include a methyl group, an ethyl group, an isopropyl group, a tert-butyl group, a cyclohexyl group, a trifluoromethyl group and a pentafluoroethyl group.

When $R^3$ is an aryl group, the aryl group preferably has from 6 to 9 carbon atoms, and specific examples thereof include a phenyl group, a pentafluorophenyl group, a p-tolyl group and a p-chlorophenyl group.

When $R^3$ is an alkoxy group, the alkoxy group preferably has from 1 to 7 carbon atoms, and specific examples thereof include a methoxy group, and ethoxy group and a phenyloxy group.

When $R^3$ is an amino group, the amino group preferably has from 1 to 7 carbon atoms, and specific examples thereof include an N,N-dimethylamino group, a piperidino group and an anilino group.

$R^3$ is preferably an alkyl group having from 1 to 6 carbon atoms, more preferably a methyl group and a trifluoromethyl group, and further preferably a methyl group.

$R^4$ represents an alkyl group. The alkyl group may be any of linear, branched or cyclic form. Linear or branched form is preferable, and linear form is more preferable. The alkyl group has preferably from 1 to 6, and more preferably from 1 to 3, carbon atoms. Specific examples of the alkyl group include a methyl group, an ethyl group, an isopropyl group, a tert-butyl group, a cyclohexyl group, a trifluoromethyl group and a pentafluoroethyl group. A methyl group is more preferable.

It is preferable that $R^3$ and $R^4$ each are an alkyl group, and it is more preferable that $R^3$ is an alkyl group having from 1 to 6 carbon atoms, and $R^4$ is a methyl group.

$R^3$ and $R^4$ may be substituted with a substituent, but it is preferable that at least one of those is substituted with a fluorine atom.

$R^1$ to $R^4$ may further be substituted with a replaceable group. Preferable examples of the substituent include a halogen atom (for example, a fluorine atom, a chlorine atom and a bromine atom, and more preferably fluorine atom), an alkyl group, an aryl group, a heterocyclic group, a cyano group, a hydroxyl group, a nitro group, a carboxyl group, an alkoxy group, an aryloxy group, a silyloxy group, a heterocylooxy group, an acyloxy group, a carbomoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a hetrocyclothoi group, a sulfamoyl group, a sulfo group, an alkylsulfenyl group, an arylsulfenyl group, an alkylsulfonyl group, an arylsulfonyl group, an acyl group, an aryloxycarbonyl group, an alkoxycarbonyl group, a carbamoyl group, an arylazo group, a heterocycloazo group, an imido group, a phosphino group, a phosphinyl group, a phosphinyloxy group, a phosphinylamino group and a silyl group.

The copolymer of type A contains, for example, the repeating unit represented by the formula (1) and the repeating unit represented by the formula (2-1) in an amount of 1% or more, respectively, and preferably contains the repeating unit represented by the formula (1) and the repeating unit represented by the formula (2-1) in an amount of 30% or more, respectively. The repeating unit represented by the formula (1) and the repeating unit represented by the formula (2-1) may contain only one kind, respectively, or may contain two kinds or more, respectively.

(Exemplified Compound of Type AA)

It is preferable that the copolymer of type A is a copolymer (type AA) containing the repeating unit represented by the formula (1) wherein at least one of $R^1$ and $R^2$ is an alkyl group having from 2 to 6 carbon atoms and a fluorine atom, or an aryl group containing a fluorine atom, and the repeating unit represented by the formula (2-1). An alkyl group having 6 or less carbon atoms is more preferable from the standpoint of synthesis suitability.

In the case of the type AA, it is preferable that $R^1$ and $R^2$ in the formula (1) each independently are an alkyl group having from 2 to 6 carbon atoms and a fluorine atom.

The alkyl group having from 2 to 6 carbon atoms and a fluorine atom may be any of linear, branched or cyclic alkyl group. Further, the alkyl group having from 2 to 6 carbon atoms and a fluorine atom is preferably an alkyl group containing a fluorine atom, having from 2 to 4 carbon atoms, and is most preferably 2,2,2-trifluoroethyl group, 2,2,3,3-tetrafluoropropyl group, 2,2,3,3,3-pentafluoropropyl group, 2,2,3,3,4,4,5,5-octafluoropentyl group, or 1-trifluoromethyl-2,2,2-trifluoroethyl group (hexafluoroisopropyl group).

When $R^1$ and $R^2$ each are an alkyl group containing a fluorine atom, having 7 or less carbon atoms, the polymer is difficult to have crystallizability, and transparency tends to improve, which is preferable.

On the other hand, the aryl group containing a fluorine atom preferably has from 6 to 9 carbon atoms. A phenylene group is preferable, and a pentafluorophenyl group is more preferable.

When $R^1$ and $R^2$ are an alkyl group or an aryl group, not corresponding to the alkyl group having from 2 to 6 carbon atoms and a fluorine atom and the aryl group containing a fluorine atom, those are preferably an alkyl group having from 1 to 9 carbon atoms (it may be any of linear, branched or cyclic alkyl group, and specifically, a methyl group, an ethyl group, an isopropyl group, a t-butyl group, a benzyl group, a cyclohexyl group, and the like are exemplified) or an aryl group having from 6 to 9 carbon atoms (specifically, a phenyl group, a p-tolyl group and the like are exemplified), and particularly preferably an alkyl group having from 1 to 4 carbon atoms.

In the ratio of the total hydrogen atom number and fluorine atom number, contained in $R^1$ and $R^2$, it is preferable that the fluorine atom number is half or more the hydrogen atom number, and it is more preferable that the fluorine atom number is larger than the hydrogen atom number.

Preferable scope of the formula (2-1) is the same as in type A.

Further, preferable content ratio of the repeating unit represented by the formula (1) and the repeating unit represented by the formula (2-1) is the same as in type A.

(Copolymer of Type B)

A preferable second embodiment of the copolymer of the invention is a copolymer (type B) containing the repeating unit represented by the formula (1) and the repeating unit represented by the formula (2-2).

In the formula (1), when $R^1$ and $R^2$ are an alkyl group, the alkyl group may be any of linear, branched or cyclic form. The alkyl group has preferably from 1 to 10, and more preferably from 1 to 6, carbon atoms. Specifically, preferable examples of the alkyl group include a methyl group, an ethyl group, an isopropyl group, a tert-butyl group, a benzyl group, and a cyclohexyl group.

In the formula (1), when $R^1$ and $R^2$ are an aryl group, an aryl group having from 6 to 8 carbon atoms is preferable. Specifically, preferable examples of the aryl group include a phenyl group and a p-tolyl group.

At least one of $R^1$ and $R^2$ contains at least one fluorine atom. $R^1$ and/or $R^2$, containing a fluorine atom are preferably an alkyl group having from 2 to 6 carbon atoms and a fluorine atom (for example, 2,2,2-trifluoroethyl group, 2,2,3,3-tetrafluoropropyl group, 2,2,3,3,3-pentafluoropropyl group, 2,2,3,3,4,4,5,5-octafluoropentyl group, and 1-trifluoromethyl-2,2,2-trifluoroethyl group (hexafluoroisopropyl group) are exemplified), or an aryl group containing a fluorine atom (for example, a pentafluorophenyl group).

In the formula (2-2), when $R^5$ and $R^6$ are an alkyl group, the alkyl group may be any of linear, branched or cyclic form. The alkyl group has preferably from 1 to 10, and more preferably from 1 to 6, carbon atoms. Specifically, preferable examples of the alkyl group include a methyl group, an ethyl group, an isopropyl group, a tert-butyl group, a benzyl group, and a cyclohexyl group. A methyl group is particularly preferable. $R^5$ and $R^6$ may be substituted with substitutents as described hereinafter. As the substituent that the alkyl group has, a halogen atom is particularly preferable.

In the formula (2-2), when $R^5$ and $R^6$ are an aryl group, the aryl group has preferably from 6 to 8 carbon atoms. Specifically, preferable examples of the aryl group include a phenyl group and a p-tolyl group.

The copolymer of type B of the invention preferably further contains the repeating unit represented by the formula (2-1), in addition to the repeating unit represented by the formula (1) and the repeating unit represented by the formula (2-2). The preferable scope and the like of $R^3$ and $R^4$ in the formula (2-1) are the same definition as described in the copolymer of type A.

The copolymer of type B of the invention preferably contains 20 mol % or more of the repeating unit represented by the formula (1), and from 0.05 to 20 mol % of the repeating unit represented by the formula (2-2).

In the case of further containing of the repeating unit represented by the formula (2-1), it is preferable to contains 20 mol % or more of the repeating unit represented by the formula (1), from 0.05 to 20 mol % of the repeating unit represented by the formula (2-2), and 20 mol % or more of the repeating unit represented by the formula (2-1). The copolymer of the invention may be that the sum of those repeating units is 100 mol %, but may contain structural units other than those.

In particular, when the repeating unit represented by the formula (2-2) is 20 mol % or less, decrease in transparency of a resin due to phase separation can effectively be suppressed, and when it is 0.05 mol or more, further sufficient mar resistance and antifouling property can be obtained when an antireflective film is formed.

It is more preferable to contain 30 mol % or more of the repeating unit represented by the formula (1).

It is more preferable to contain from 0.5 to 15 mol % of the repeating unit represented by the formula (2-2).

In addition, it is more preferable to contain 30 mol % or more of the repeating unit represented by the formula (2-1).

The copolymer of the invention contains at least the repeating unit represented by the formula (1) and the repeating unit represented by the formula (2-2), but those may be contained in one kind alone, or in two kinds or more, respectively. Further, in the case of containing the repeating unit represented by the formula (2-1), the repeating unit represented by the formula (2-1) may be contained in one kind alone, or in two kinds or more.

Specific examples of the copolymer of the invention are exemplified below, but the invention is not limited to those specific examples. x, y and z each represent the proportion of the repeating unit (mol %), and are $0 \leqq x+y+z \leqq 100$ (where z is not present, $0 \leqq x+y \leqq 100$). Preferably, the proportions are $1<x<99$, and $1<y<99$, and it is preferable that x and y each are 30 or more. Further, repeating units other than those may be contained.

The compounds of the following specific examples may be that chains are connected with each other by a crosslinking agent or a crosslinkable monomer.

(SU-0501) and (SU-1001) show siloxane units originated from initiators VPS-0501 and VSP-1001 described hereinafter.

Exemplified Compounds of Type A

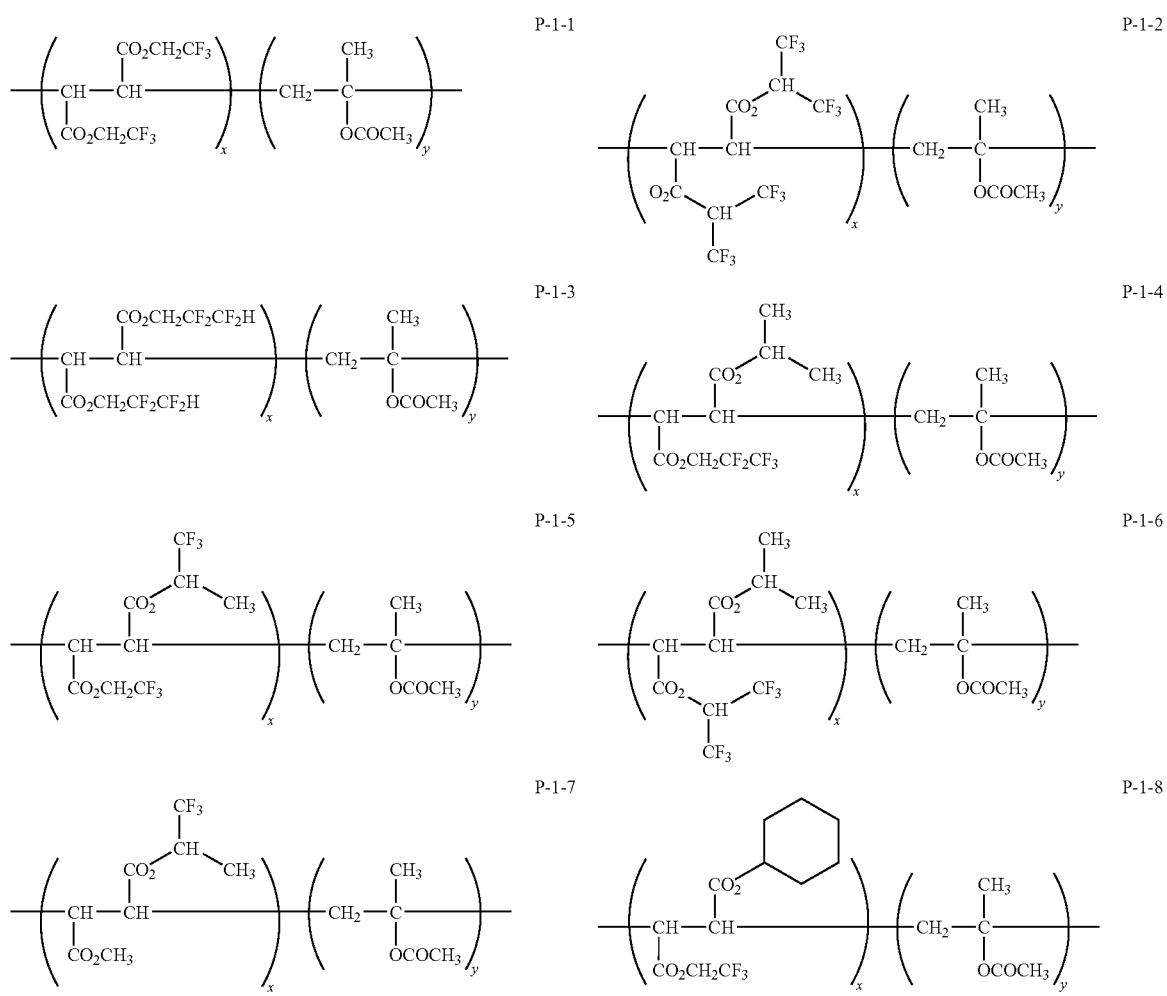

-continued
P-1-9
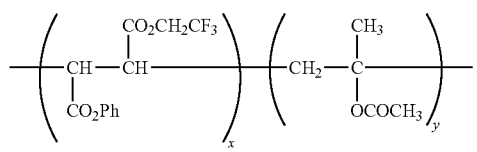
P-1-10
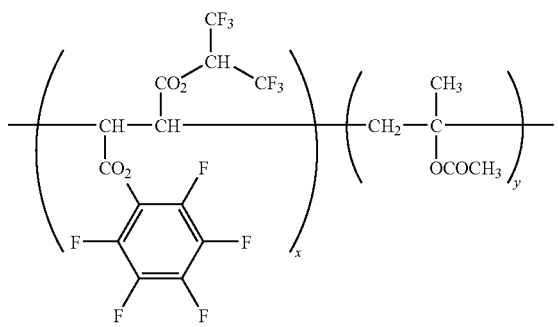
P-1-11
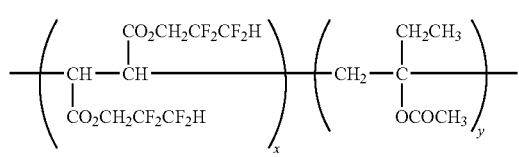
P-1-12
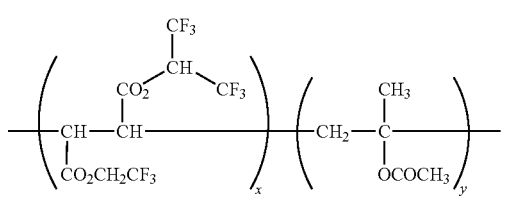
P-1-13
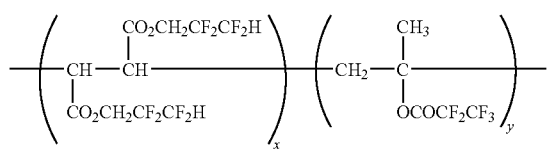
P-1-14
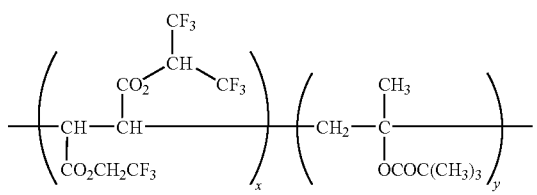
P-1-15
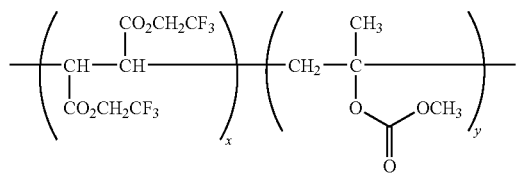
P-1-16
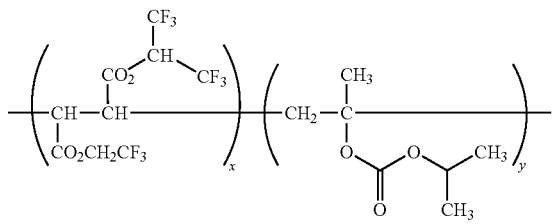
P-1-17
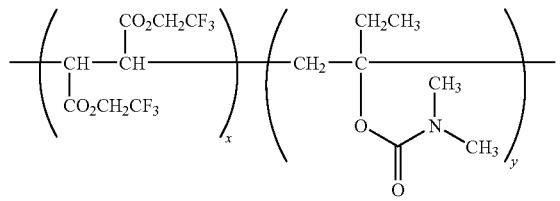
P-1-18
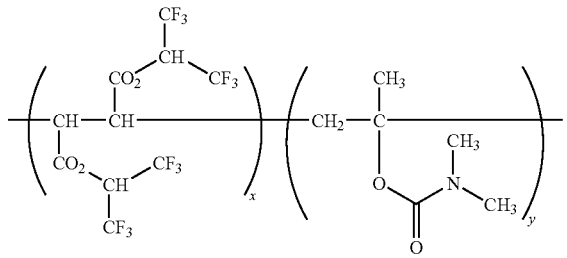
P-1-19
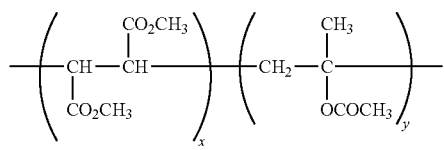
P-1-20
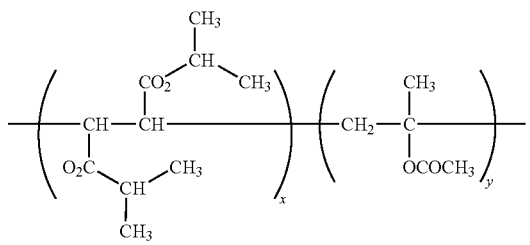

-continued
P-1-21
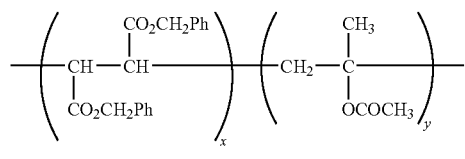
P-1-22
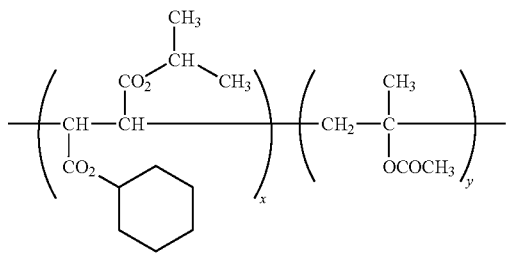
P-1-23
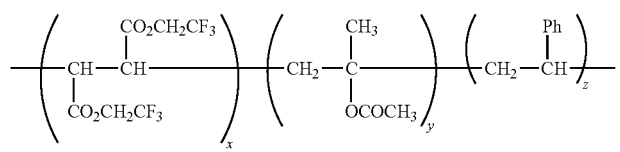
P-1-24
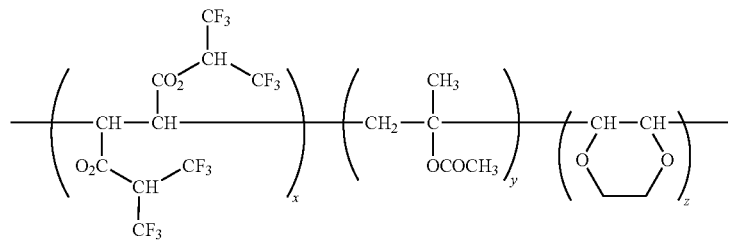
P-1-25
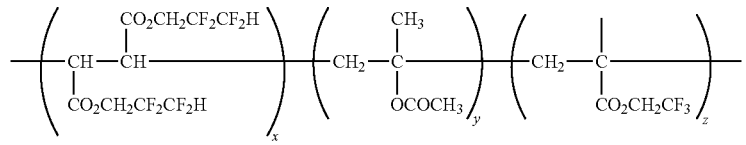
P-1-26
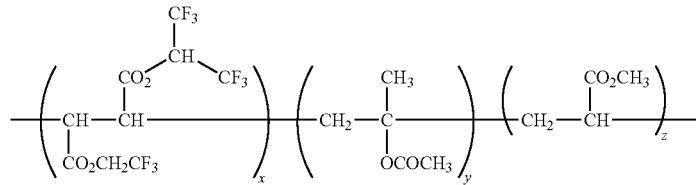
Exemplified Compounds of Type B
P-2-1
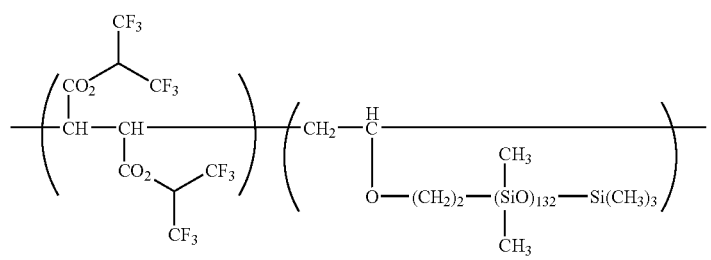

-continued
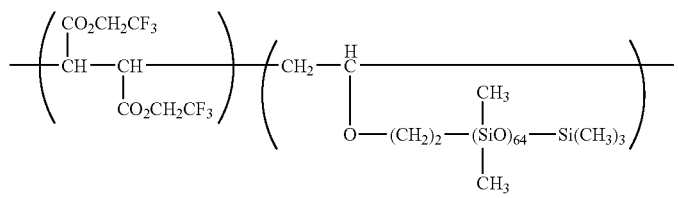
P-2-2
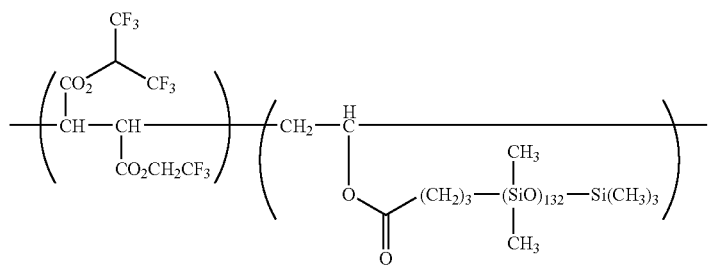
P-2-3
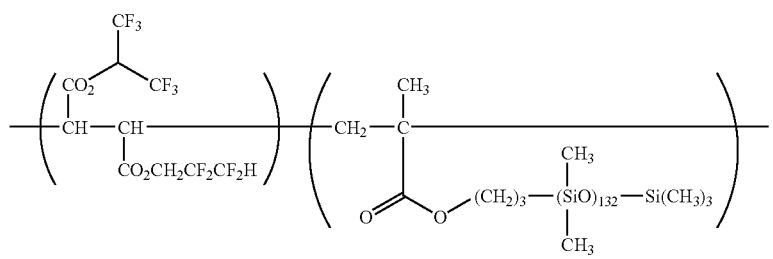
P-2-4
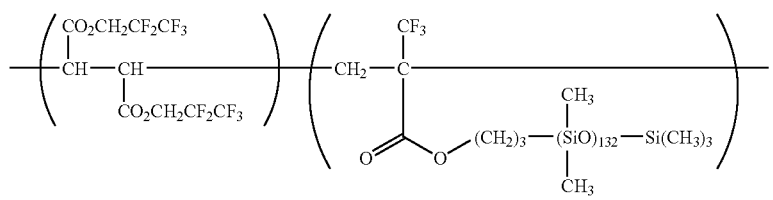
P-2-5
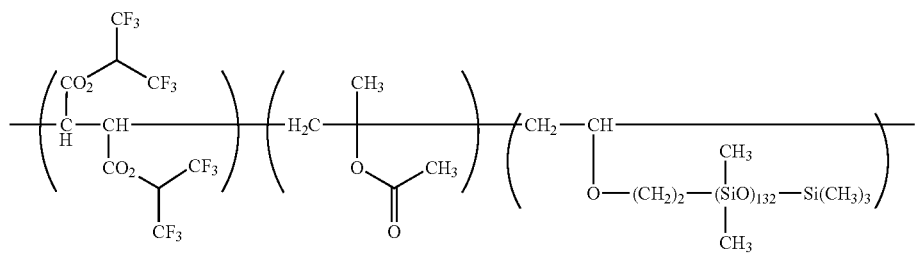
P-2-6
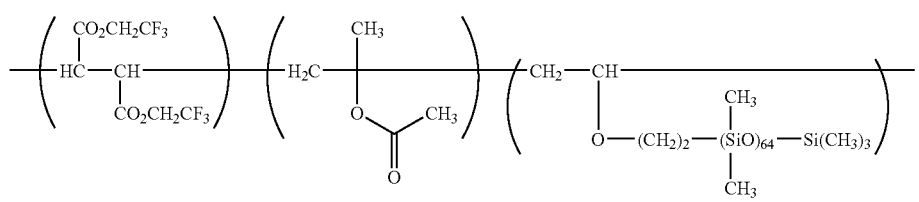
P-2-7

-continued
P-2-8
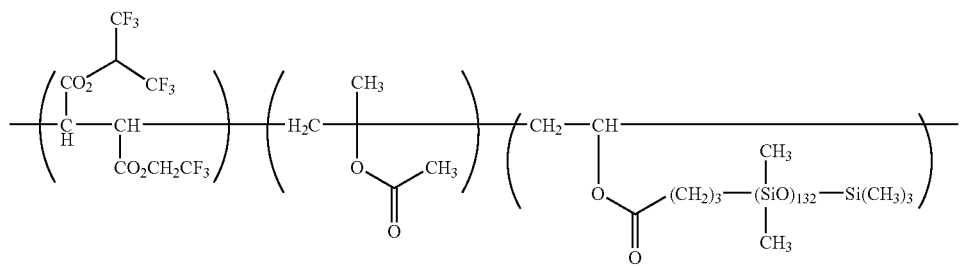
P-2-9
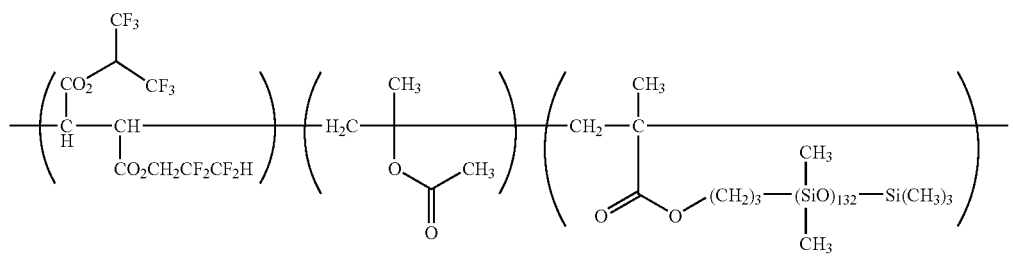
P-2-10
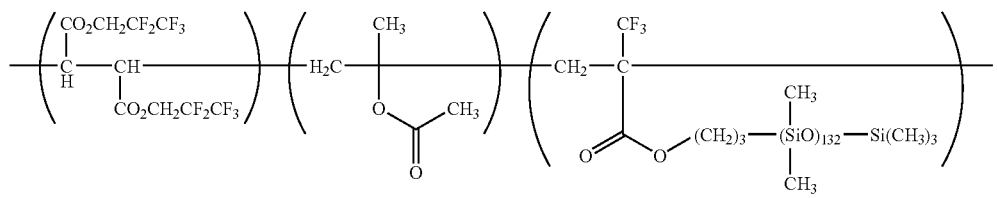
P-2-11
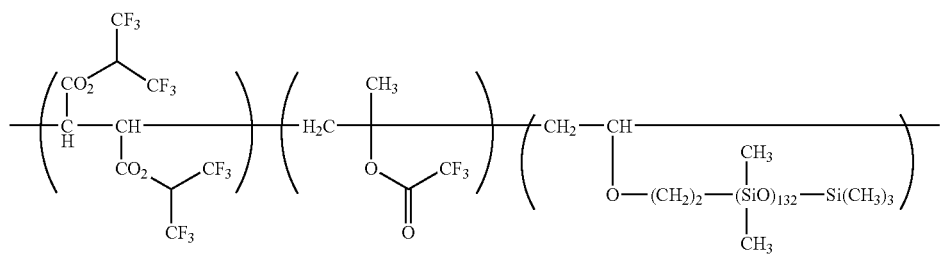
P-2-12
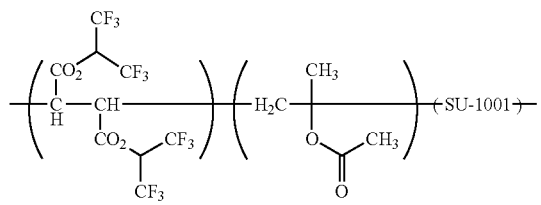
P-2-13
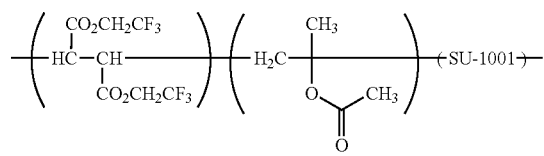
P-2-14
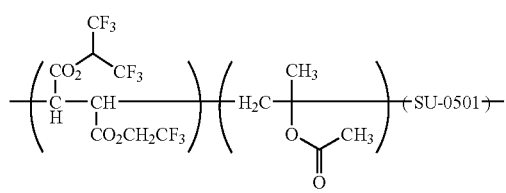
P-2-15
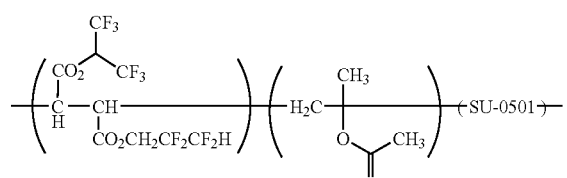
P-2-16
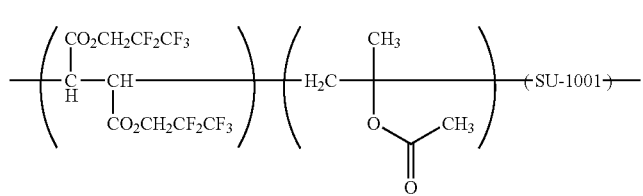

-continued
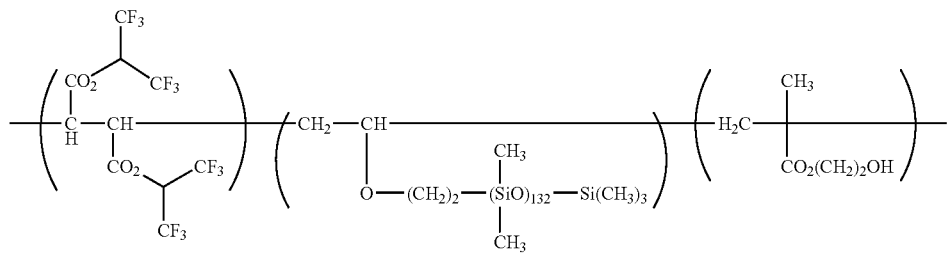
P-2-17
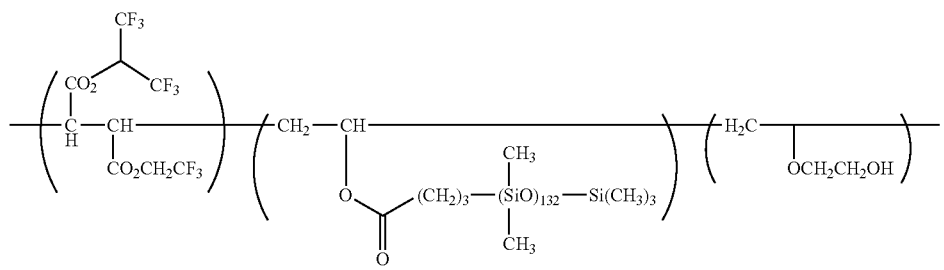
P-2-18
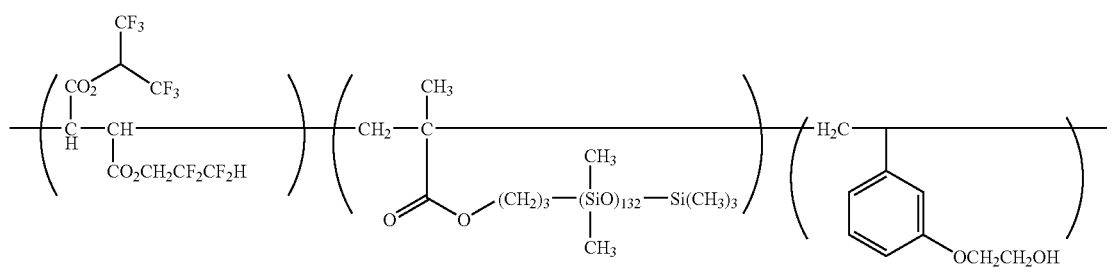
P-2-19
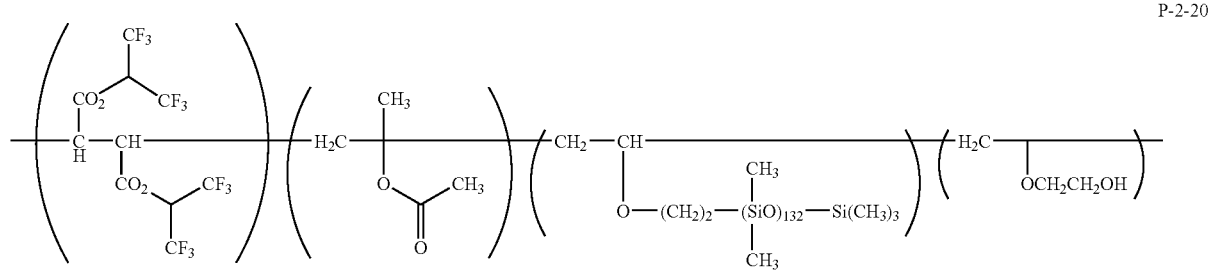
P-2-20
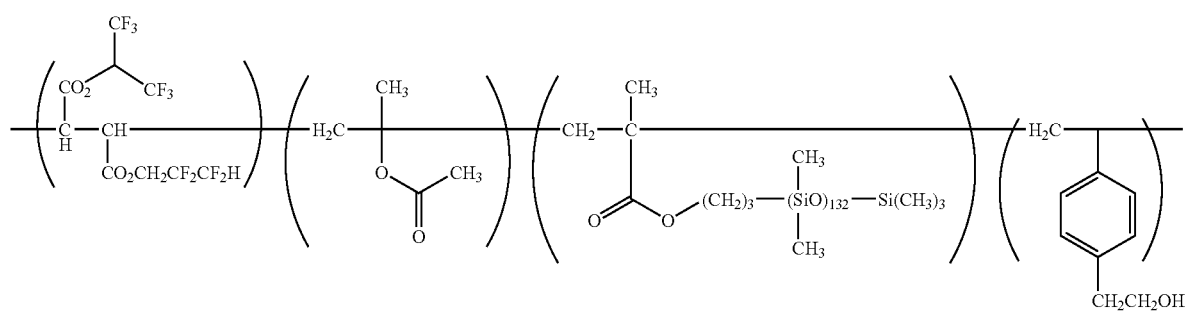
P-2-21

-continued
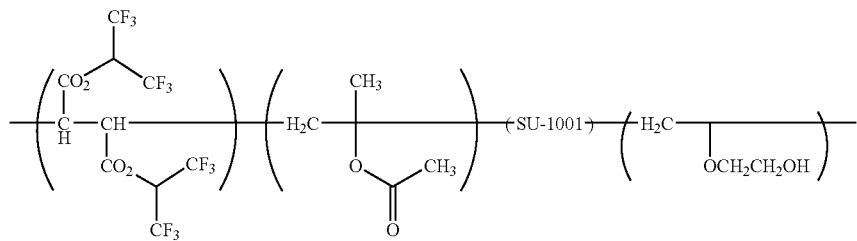
P-2-22
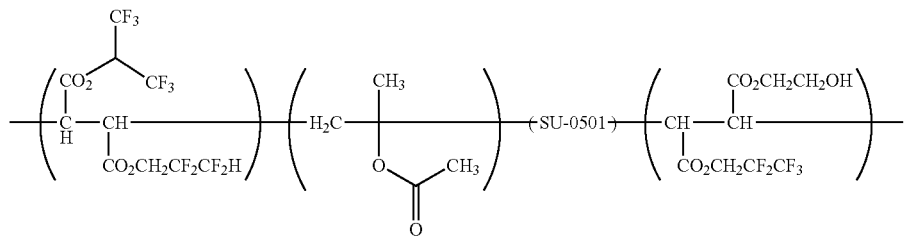
P-2-23
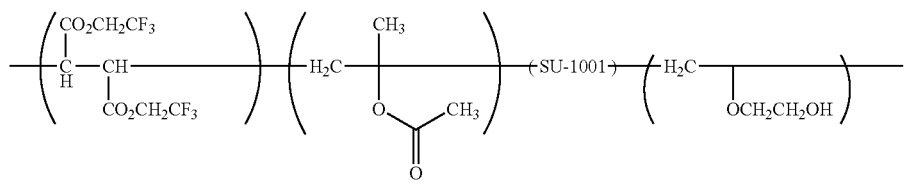
P-2-24
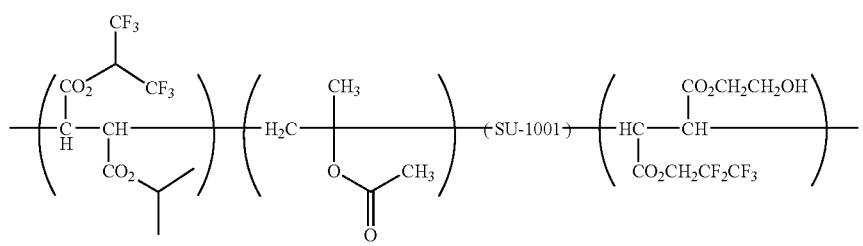
P-2-25
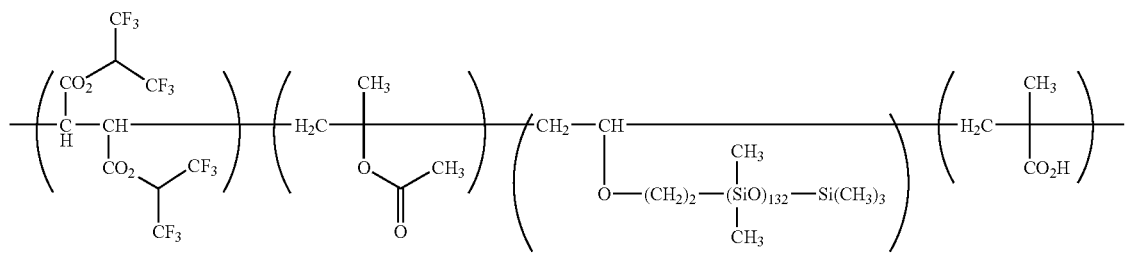
P-2-26
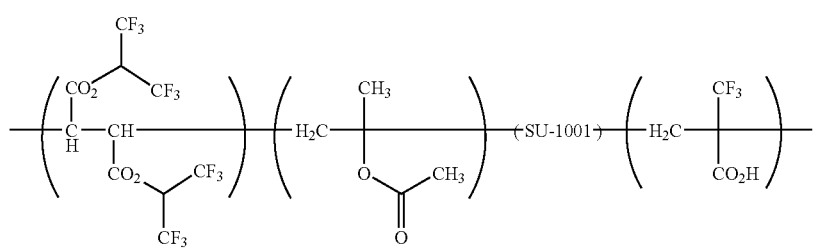
P-2-27

-continued
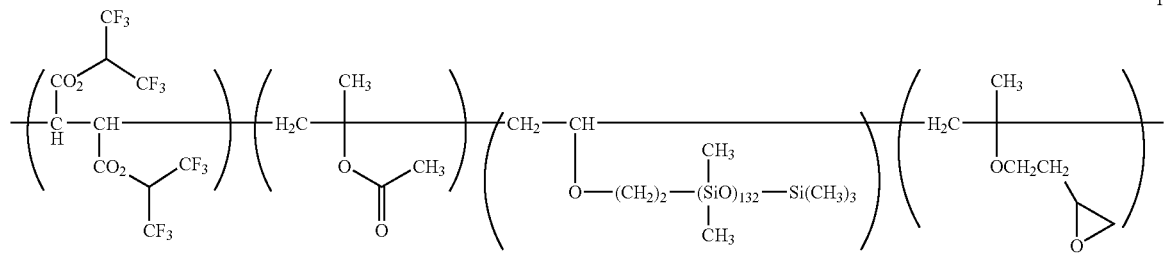
P-2-28
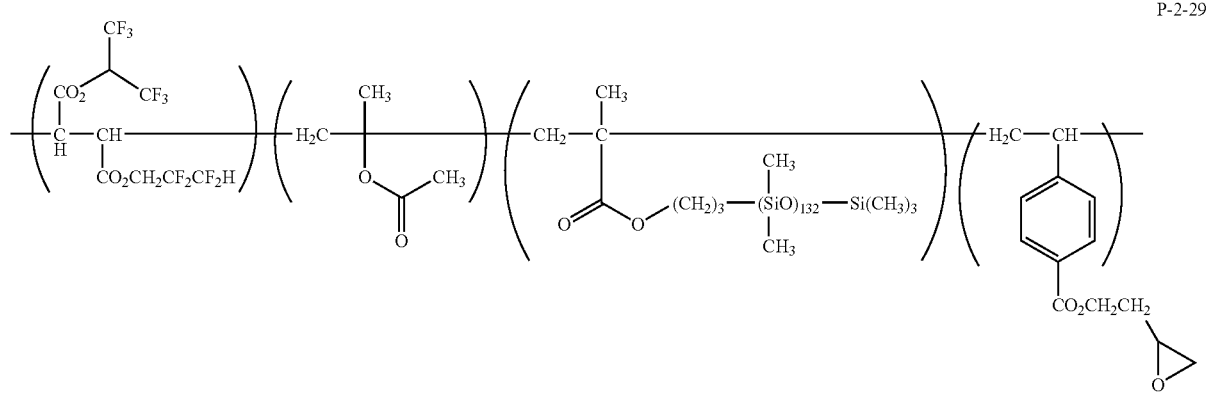
P-2-29
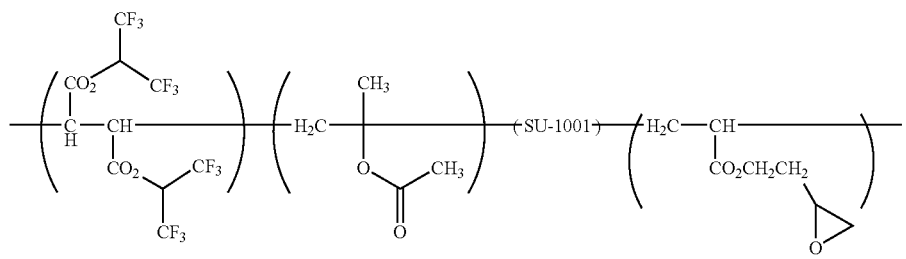
P-2-30
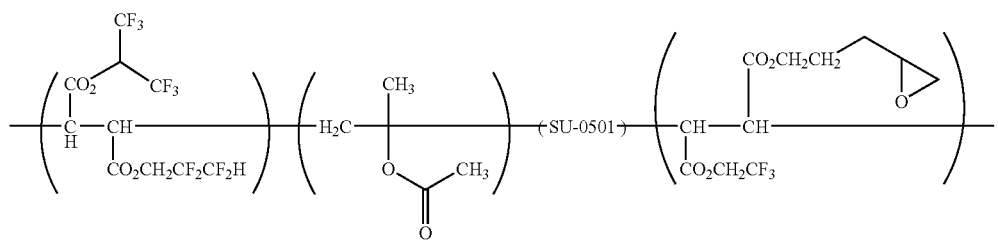
P-2-31
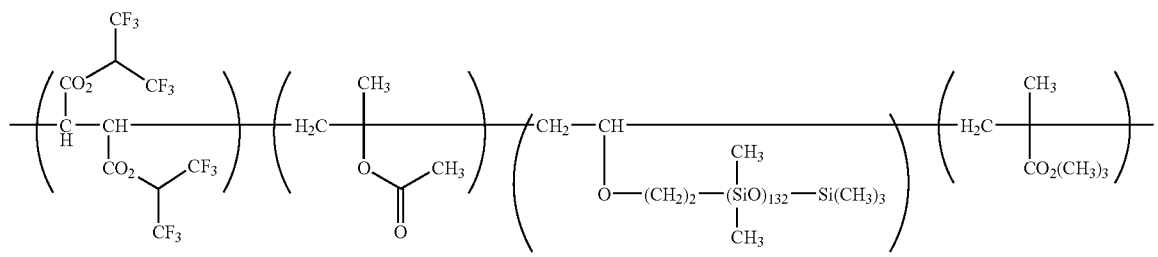
P-2-32

-continued

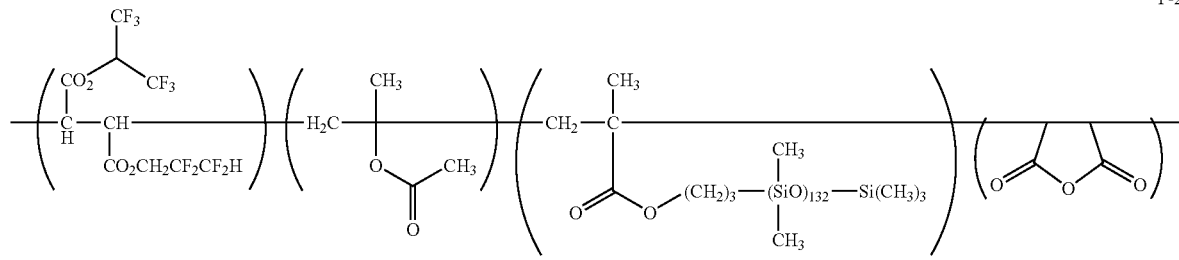
P-2-33

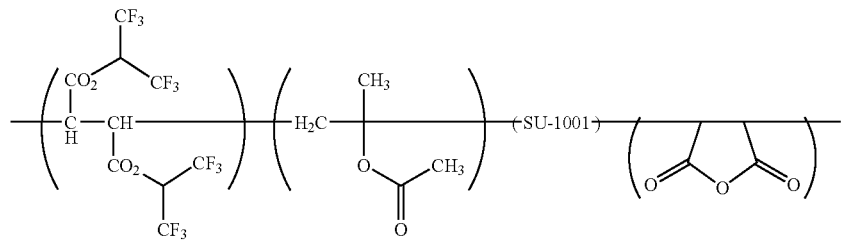
P-2-34

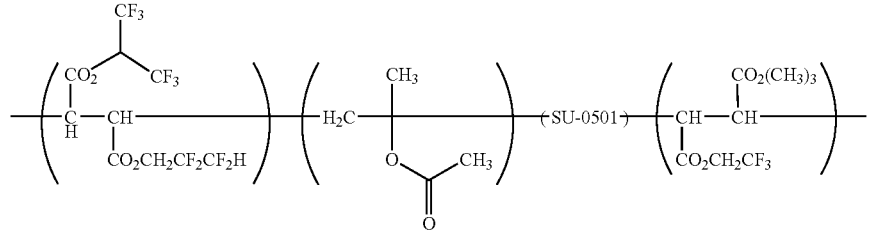
P-2-35

The copolymer of the invention is a transparent (ultraviolet to near infrared region) and amorphous copolymer, and is soluble in a general solvent (particularly, tetrahydrofuran (THF), ethyl acetate and acetone).

The copolymer of the invention has a number average molecular weight (Mn) of preferably from 1,000 to 1,000,000, more preferably from 2,000 to 800,000, and further preferably from 10,000 to 600,000, particularly preferably from 50,000 to 400,000, and most preferably from 100,000 to 300,000, in terms of styrene conversion measured with a gel permeation chromatography.

The copolymer of the invention has a weight average molecular weight (Mw) of preferably from 2,000 to 1,000,000, more preferably from 20,000 to 1,000,000, further preferably from 100,000 to 600,000, and particularly preferably from 150,000 to 600,000.

The copolymer of the invention has. Mw/Mn of preferably 3.5 or less, more preferably 2.5 or less, and further preferably 2.0 or less.

The copolymer of the invention has a glass transition temperature (Tg) of preferably from 25 to 250° C., more preferably from 60 to 200° C., further preferably from 80 to 180° C., particularly preferably from 80 to 160° C., and most preferably from 80 to 130° C.

The copolymer of the invention has an elastic modulus of preferably 800 MPa or more, and more preferably from 1,000 to 3,000 MPa.

The copolymer of the invention has a tensile strength of preferably 20 MPa or more, and more preferably from 25 to 45 MPa.

The copolymer of the invention has a refractive index of preferably 1.5 or less, and more preferably 1.45 or less.

The copolymer of the invention preferably has low hygroscopic property, and, for example, it is preferable that a saturated water absorption at 25° C. is less than 1%.

The copolymer of the invention preferably has transparency.

Where the copolymer used in the invention obtained as above is used in, for example, optical materials such as optical waveguides as described hereinafter, it is preferable that the copolymer is a transparent (ultraviolet to near infrared region) and amorphous copolymer, and is soluble in a general solvent (particularly, tetrahydrofuran (THF), ethyl acetate and the like).

(Polymerizable Composition)

The polymer is obtained by polymerizing a polymerizable composition containing a compound represented by the formula (3), and at least one of a compound represented by the formula (4) and a polysiloxane-containing compound.

$$R^1O_2C-CH=CH-CO_2R^2 \qquad \text{Formula (3)}$$

In the formula (3), $R^1$ and $R^2$ represent an alkyl group (excluding the case that the alkyl group contains a group represented by $-(CX_2)_n-X$ (X is a halogen atom, and n is an integer of 7 or more)), or an aryl group, provided that at least one of $R^1$ and $R^2$ contains a fluorine atom.

In the formula (3), $R^1$ and $R^2$ are the same as defined in the formula (1), and the preferable scope is also the same as defined therein. The unsaturated compound includes a trans form (fumaric acid diester) and a cis form (maleic acid diester), and may be either of those. Trans form is preferable.

Where $R^1$ and $R^2$ are the same ($R^1=R^2=R$), the fumaric acid diester that is the compound represented by the formula (3) can be synthesized by a single step from commercially available fumaroyl chloride and alcohol as shown below. Where $R^1$ and $R^2$ differ, the compound is obtained by using maleic anhydride as a starting material, and successively reacting the same with two kinds of the corresponding alcohols using, for example, a method described in JP-A-8-160365.

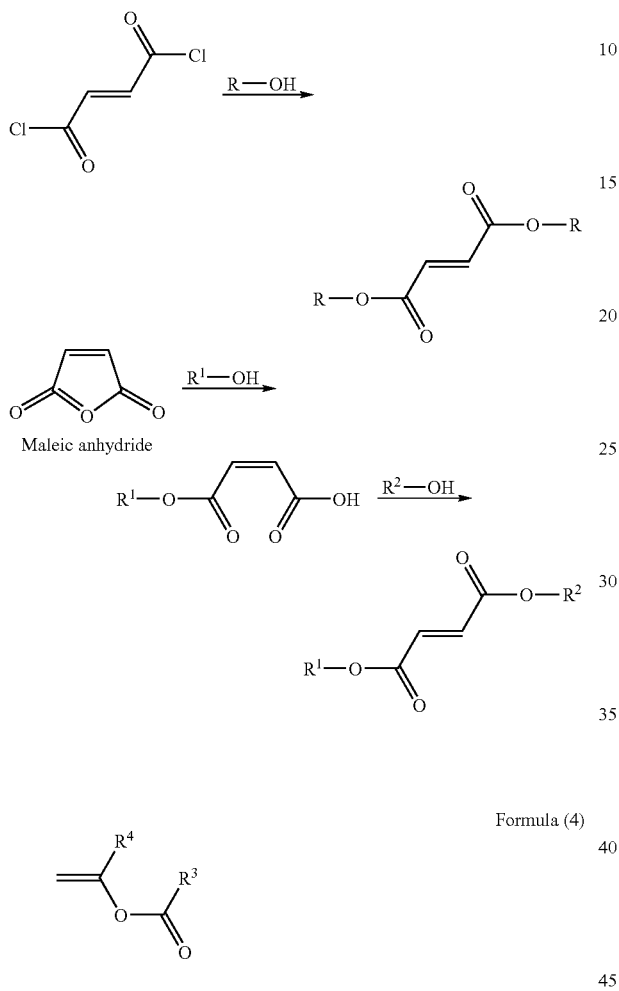

Formula (4)

In the formula (4), $R^3$ represents an alkyl group, an aryl group, an alkoxy group or an amino group (which may be an anilino group), and $R^4$ represents an alkyl group.

In the formula (4), $R^3$ represents an alkyl group, an aryl group, an alkoxy group or an amino group, and $R^4$ represents an alkyl group. $R^3$ and $R^4$ are the same as defined in $R^3$ and $R^4$ in the formula (2-1), respectively, and the preferable scope is also the same as defined therein.

The compound represented by the formula (3), the compound represented by the formula (4) and the polysiloxane-containing compound may be contained in two kinds or more, respectively. Further, other monomers may be contained. As such other monomers, monomers copolymerizable with the compound represented by the formula (3), the compound represented by the formula (4) and/or the polysiloxane-containing compound can widely be used. Specific examples of the other monomer include acrylates, methacrylates, styrenes, vinyl esters, vinyl ethers and dioxenes.

The preferable embodiment of the polymerizable composition of the invention is a polymerizable composition containing, at least, at least one of the compound represented by the formula (3) and at least one of the compound represented by the formula (4). The ratio (molar ratio) of the compound represented by the formula (3) and the compound represented by the formula (4) is preferably from 60:40 to 40:60. The preferable scope of the compound represented by the formula (3) and the compound represented by the formula (4) is the same as defined above.

Another preferable embodiment of the polymerizable composition of the invention is a polymerizable composition containing the compound represented by the formula (3), the compound represented by the formula (4) and a siloxane unit-containing compound. Those compounds each may be contained in only one kind or two kinds or more.

Specific examples of the compound represented by the formula (3) used in the invention are exemplified below, but the invention is not limited to those specific examples.

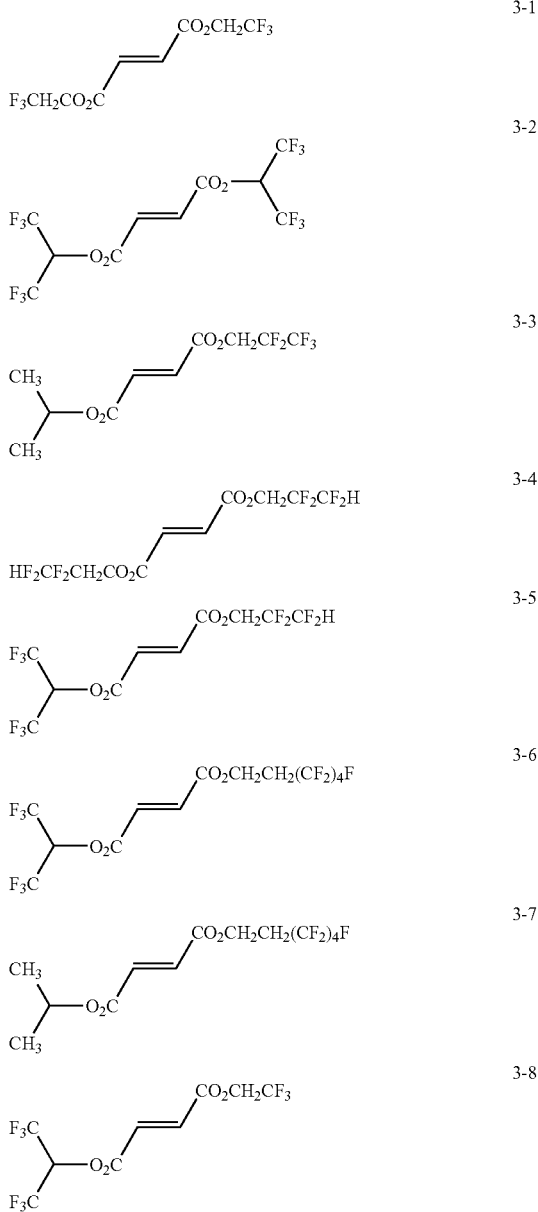

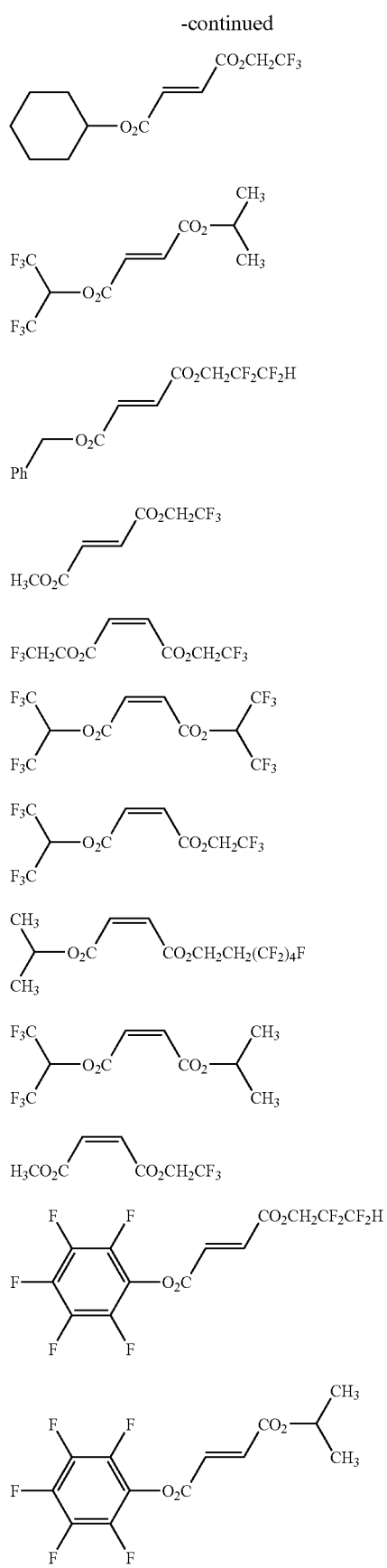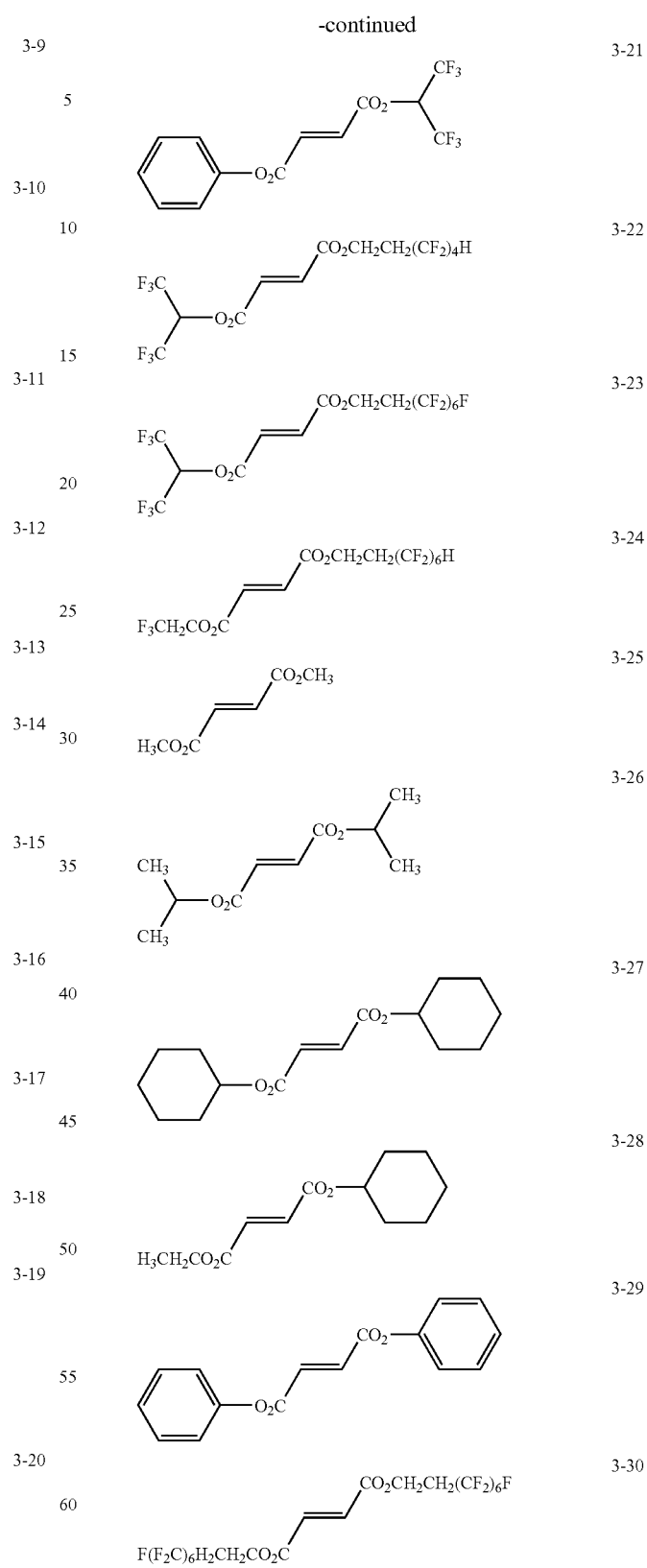
Specific examples of the compound represented by the formula (4) used in the invention are exemplified below, but the invention is not limited to those specific examples.

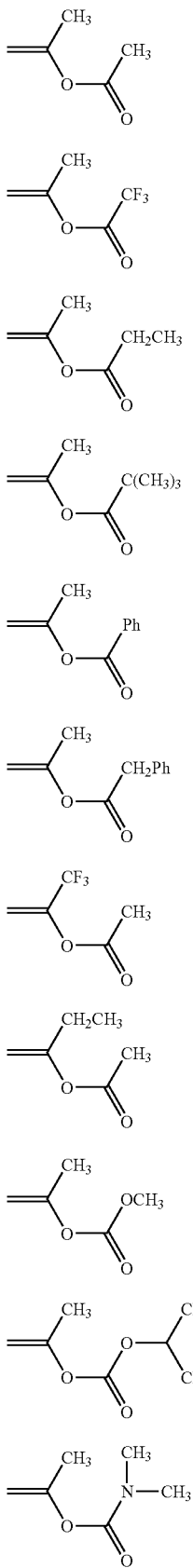

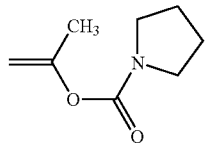

As the siloxane unit-containing compound, the exemplified compounds of the compounds represented by the formula (6) to (10) described hereinafter can preferably be employed.

It is preferable that the copolymer of the invention is obtained by radical polymerization of the polymerizable composition in the presence of a polymerization initiator. The radical polymerization is advantageous in the standpoint of easiness of operation because of allowing the presence of moisture, and has the merit that it is easy to obtain a relatively high molecular weight material. As the method of producing by radical polymerization, the conventional methods can be used for the production. Examples of the method that can be used include a bulk polymerization, a solution polymerization, an emulsion polymerization in water or in an emulsion, and a suspension polymerization. The polymerization method is appropriately selected depending on the performances required in optical members used. For example, in the case of a core material of optical fibers, a bulk polymerization is preferable, and in the case of a cladding material of optical fibers, it is preferable to appropriately select from a bulk polymerization, a solution polymerization, an emulsion polymerization and a suspension polymerization.

A solvent used in the liquid polymerization is not particularly limited, but ethyl acetate, butyl acetate, methyl ethyl ketone or the like is preferably used.

The polymerization initiator can appropriately be selected according to monomers used and the polymerization method. Examples of the polymerization initiator are peroxide compounds such as benzoyl peroxide (BPO), tert-butylperoxy-2-ethylhexanate (PBO), di-tert-butylperoxide (PBO), tert-butylperoxyisopropyl carbonate (PBI) and n-butyl 4,4-bis(tert-butylperoxy)valarate (PHV), and azo compounds such as 2,2'-azobisisobutyronitrile, 2,2'-azobis(2-methylbutyronitrile), 1,1'-azobis(cyclohexane-1-carbonitrile, 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(2-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate) and di-tert-butyl-2,2'-azobis(2-methylpropionate). Those polymerization initiators may be used as mixtures of two or more thereof.

In the case of a process conducting in an aqueous medium, an organic free radical initiator such as a persulfates or a "redox" compound can further be used.

A chain transfer agent may appropriately be used for regulating a molecular weight. The chain transfer agent is used to regulate a molecular weight of the polymer. The chain transfer agent can appropriately select its kind and addition amount according to the kind of the polymerizable monomer.

Chain transfer constant of a chain transfer agent to each monomer can refer to, for example, Polymer Handbook, 3$^{rd}$ Edition (J. BRANDRUP and E. H. IMMERGUT, Published by JOHN WILEY & SON). The chain transfer constant can further be determined by the experiment by reference to Takayuki Ohtsu and Masayoshi Kinoshita, Experimental Method of Polymer Synthesis, Kagaku-dojin Publishing Co. (1972).

As the chain transfer agent, alkyl mercaptans (such as n-butyl mercaptan, n-pentyl mercaptan, n-octyl mercaptan, n-lauryl mercaptan, and tert-dodecyl mercaptan), thiophenols (such as thiophenol, m-bromothiophenol, p-bromothiophenol, m-toluenethiol, and p-toluenethiol), and the like are preferably used. Of those, the alkylmercaptans such as n-octyl mercaptan, n-lauryl mercaptan and tert-dodecyl mercaptan are more preferably used. Chain transfer agent in which a hydrogen atom in C—H bond is substituted with a heavy hydrogen atom or a fluorine atom can also be used. The chain transfer agent may be used as mixtures of two or more thereof.

Polymerization temperature generally depends on decomposition rate of the polymerization initiator selected, and is preferably from 0 to 200° C., and more preferably from 40 to 120° C. Where a gaseous monomer is used as the comonomer, polymerization is preferably conducted in a pressure vessel such as an autoclave, and a pressure applied at that time is, for example, from atmospheric pressure to 50 bar, and preferably from 2 to 20 bar.

The method of producing the copolymer of type A of the invention includes a method of obtaining a polymer by polymerizing the compound represented by the formula (3) and the compound represented by the formula (4), as shown below. Other methods can also be used. The other methods include a method of polymerizing maleic anhydride and the compound represented by the formula (4), and esterifying by a polymer reaction, as shown in the following reaction formula.

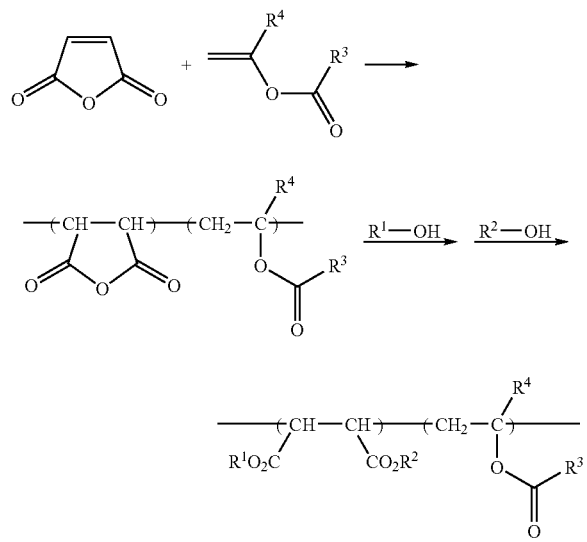

In the reaction formula, $R^1$ to $R^4$ are the same as defined in $R^1$ to $R^4$ the formula (1) or (2-1).

Introduction site of the repeating unit (siloxane unit) contained in the copolymer of type B of the invention and introduction method thereof are not particularly limited, but the following three methods are the representative and preferable method.

(1) A method of introducing a fumarate having a siloxane unit as one of monomers into a side chain.

(2) A method of introducing into a side chain using a vinyl monomer having a siloxane unit.

(3) A method of introducing into a side chain using an initiator having a siloxane unit.

(1) A Method of Introducing A Fumarate Having A Siloxane Unit as One of Monomers into A Main Chain It is preferable to use a compound represented by the following formula (6) (fumaric acid ester or maleic acid ester) as one of raw materials.

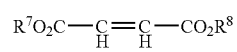

Formula (6)

In the formula (6), at least one of $R^7$ and $R^8$ is a substituent represented by the following SU-1:

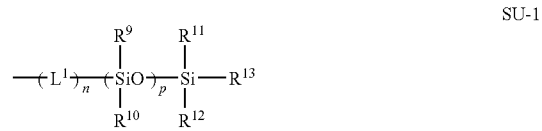

SU-1

In the above formula, $R^9$ to $R^{13}$ each represent a hydrogen atom, an alkyl group or an aryl group, $L^1$ represents a connecting group having from 1 to 20 carbon atoms, n is an integer of 0 or 1, and p is an integer of from 10 to 1000. When only one of $R^7$ and $R^8$ is SU-1, the other represents an alkyl group or an aryl group.

When $R^7$ and $R^8$ are an alkyl group, the alkyl group may be any of linear, branched and cyclic form. The alkyl group has preferably 10 or less, and more preferably 5 or less, carbon atoms. Specific examples of the alkyl group include a methyl group, an ethyl group, n-propyl group, isopropyl group, n-butyl group, tert-butyl group, trifluoromethyl group, 2-trifluoroethyl group, and 1H,1H,3H-tetrafluoropropyl group.

When $R^7$ and $R^8$ are an aryl group, the aryl group preferably has from 6 to 8 carbon atoms. Preferable examples of the aryl group include a phenyl group, a methylphenyl group, a pentafluorophenyl group, and p-methoxyphenyl group.

When $R^9$ to $R^{13}$ are an alkyl group, the alkyl group may be any of linear, branched and cyclic form. The alkyl group has preferably 10 or less, and more preferably 5 or less, carbon atoms. Specific examples of the alkyl group include a methyl group, an ethyl group, n-propyl group, isopropyl group, n-butyl group, tert-butyl group, trifluoromethyl group, 2-trifluoroethyl group, and 1H, 1H, 3H-tetrafluoropropyl group.

When $R^9$ to $R^{13}$ are an aryl group, the aryl group preferably has from 6 to 8 carbon atoms. Preferable examples of the aryl group include a phenyl group, a methylphenyl group, a pentafluorophenyl group, and p-methoxyphenyl group.

As $R^9$ to $R^{13}$, an alkyl group is preferable, and a methyl group is particularly preferable.

$L^1$ is preferably an alkylene group having 5 or less carbon atoms.

p is preferably an integer of from 30 to 500.

$R^7$ to $R^{13}$ may have a substituent. As the substituent, in addition to a halogen atom (preferably a fluorine atom), substituents exemplified as the substituents of the above $R^1$ to $R^6$ are exemplified as the preferable examples.

Specific examples of the compound represented by the formula (6) are exemplified below, but the invention is not limited to those specific examples.

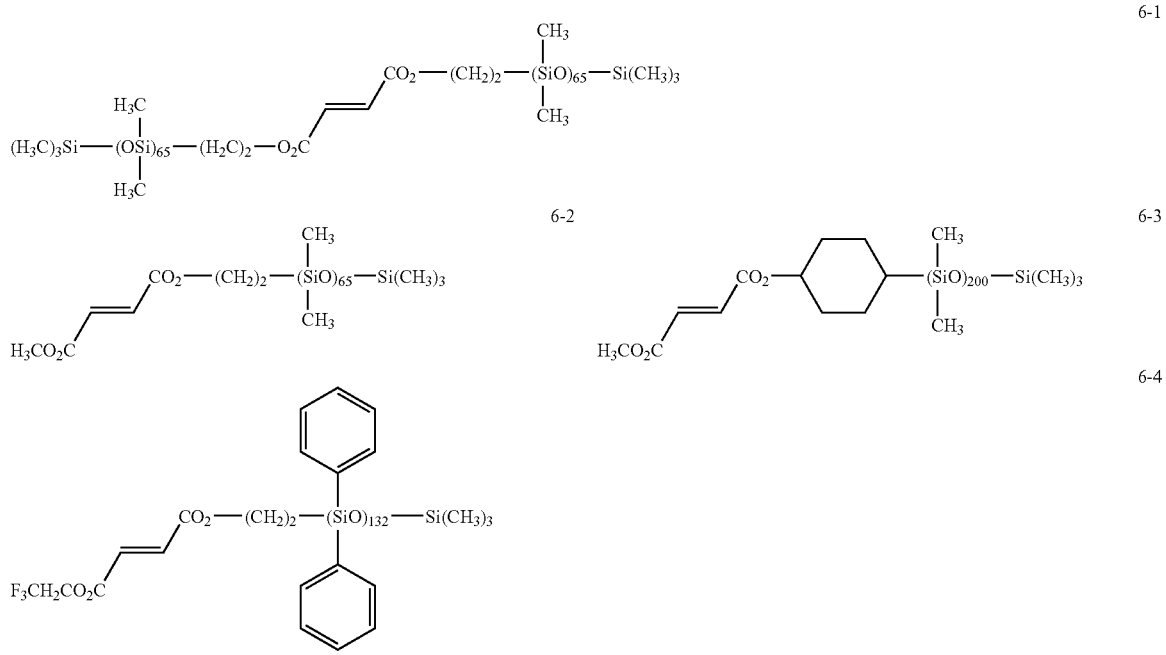

(2) A Method of Introducing into a Side Chain Using a Vinyl Monomer Having a Siloxane Unit It is possible to use as a raw material an optional siloxane-containing vinyl monomer copolymerizable with the compound represented by the formula (4) and the compound represented by the formula (5). For example, it is preferable to use at least one of a compound represented by the following formula (7), a compound represented by the following formula (8) and a compound represented by the following formula (9).

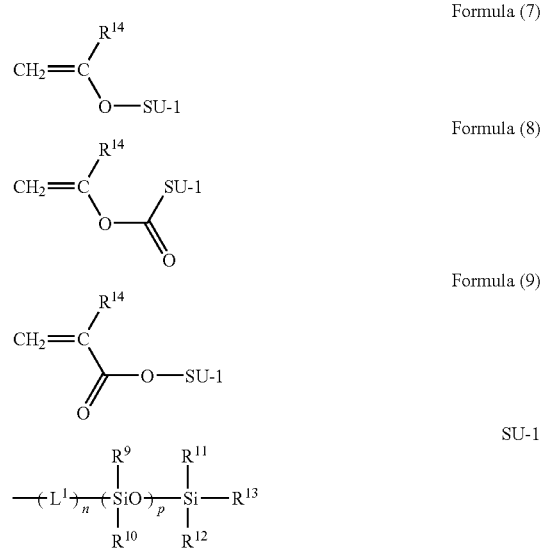

In the formulae (7) to (9), $R^{14}$ represents a hydrogen atom, a methyl group or a trifluoromethyl group, and a hydrogen atom and a methyl group are preferable.

The definition and preferable examples of $R^9$ to $R^{13}$, $L^1$ p, n in SU-1 are the same as defined in the formula (6), and the preferable scope is also the same as defined therein.

Specific examples of the compounds represented by the formulae (7) to (9) are exemplified below, but the invention is not limited to those specific examples.

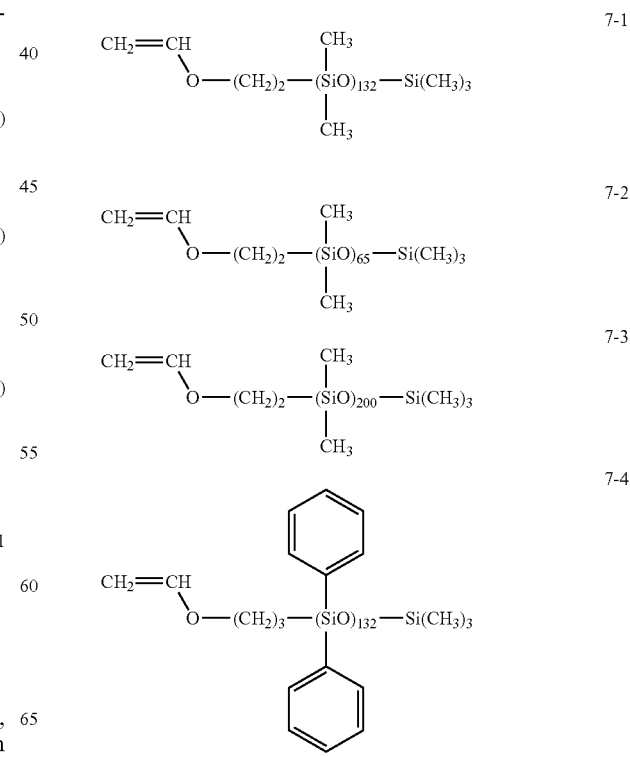

-continued
7-5
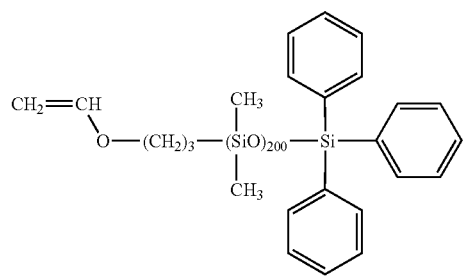
7-6
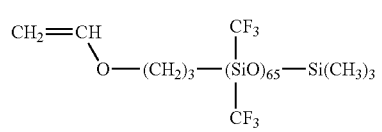
8-1
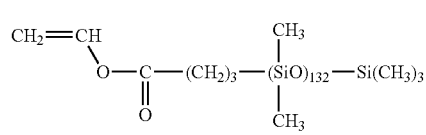
8-2
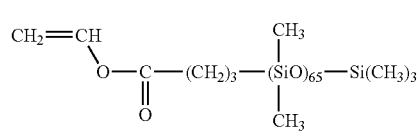
8-3
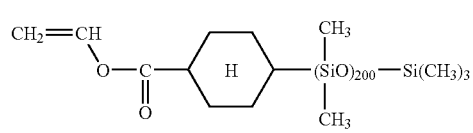
8-4
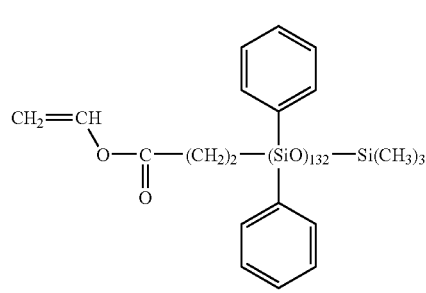
8-5
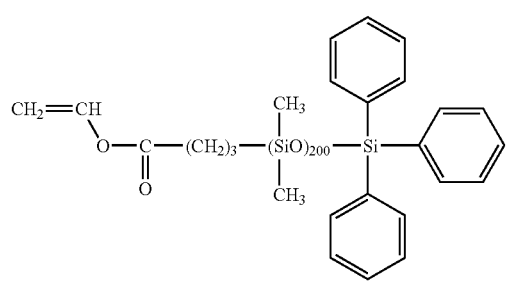
8-6
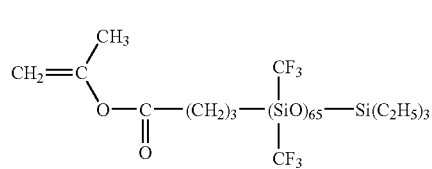
-continued
9-1
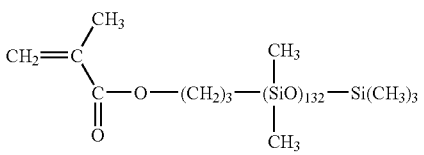
9-2
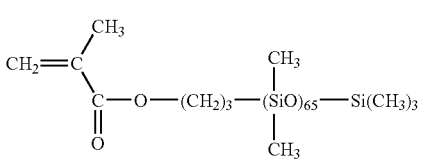
9-3
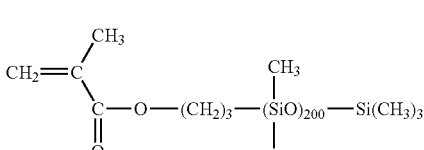
9-4
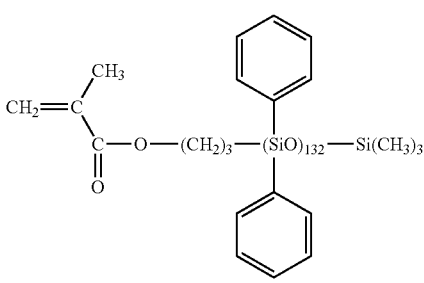
9-5
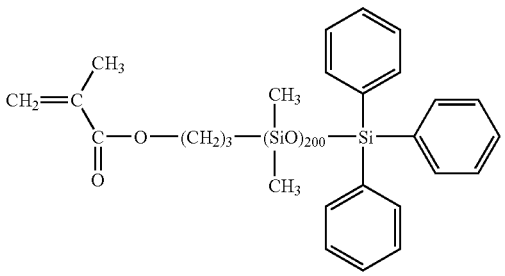
9-6
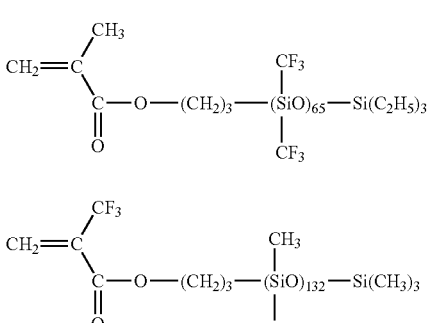
9-7
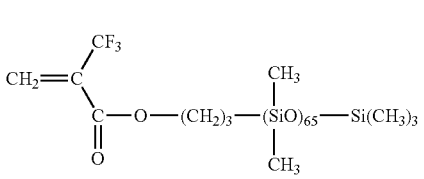
9-8

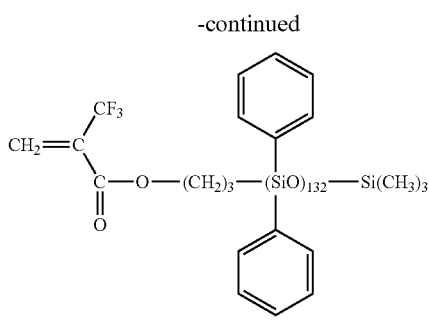

9-9

(3) A Method of Introducing into a Main Chain Using an Initiator Having a Siloxane Unit By using an initiator having a siloxane unit in the molecule, it is possible to introduce the siloxane unit into the main chain. The kind of the initiator having a siloxane unit is not particularly limited, but a siloxane unit-containing azo initiator having a repeating unit represented by the following formula (10) is exemplified as the example.

linear or branched alkyl group is preferable. The alkyl group has preferably 10 or less, and more preferably 5 or less, carbon atoms. Specific examples of the alkyl group include a methyl group, an ethyl group, n-propyl group, isopropyl group, n-butyl group, tert-butyl group, trifluoromethyl group, 2-trifluoroethyl group, and 1H,1H-pentafluoropropyl group.

When $R^{15}$ to $R^{18}$ in the formula (10) are an aryl group, the aryl group preferably has from 6 to 8 carbon atoms. Preferable examples of the aryl group include a phenyl group, a methylphenyl group, a pentafluorophenyl group, and p-methoxyphenyl group.

X preferably is an integer of from 30 to 500.

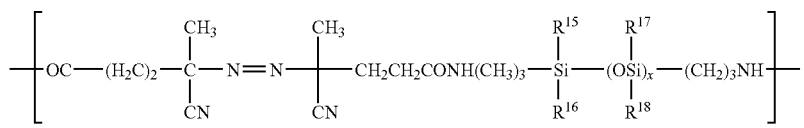

Formula (10)

Specific examples of the siloxane unit-containing initiator represented by the formula (10) are exemplified below, but the invention is not limited to those specific examples.

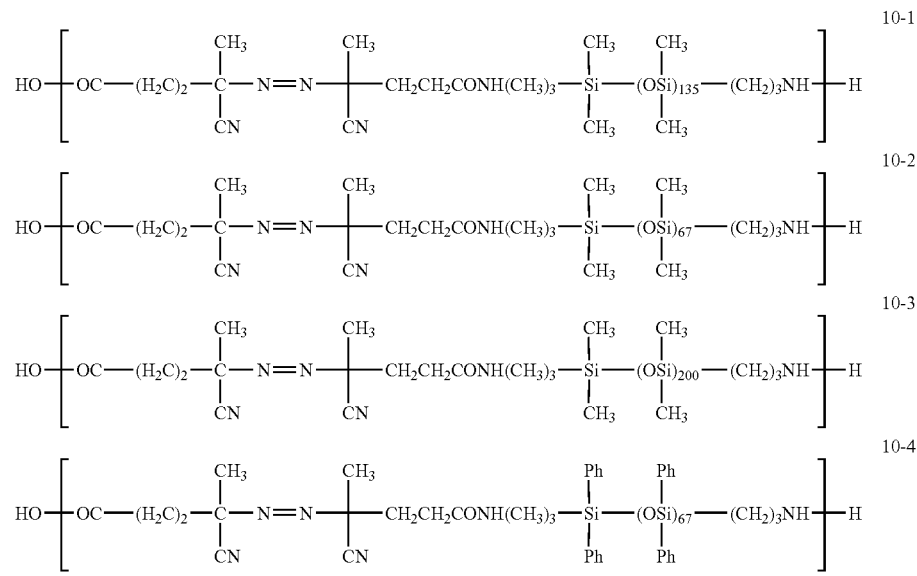

In the formula (10), $R^{15}$ to $R^{18}$ each represent an alkyl group or an aryl group, and x is an integer of from 10 to 1,000.

When $R^{15}$ to $R^{18}$ in the formula (10) are an alkyl group, the alkyl group may be any of linear, branched and cyclic form. A Of those, VPS1001 (10-1) and VPS0501 (10-2) that are the polysiloxane-containing azo initiators, products of Wako Pure Chemical Industries, Ltd., are exemplified as the particularly preferable example.

When polymerization is conducted using those siloxane unit-containing initiators, other general radical polymerization initiators may be used together.

Other than the raw material monomers of the copolymer of the invention (for example, the compound represented by the formula (3), the compound represented by the formula (4), and the compound represented by the formula (6)), optional vinyl monomers (monomer C) copolymerizable with the raw material monomers may be used. The monomer C can has a function of imparting adhesion or solvent solubility, or as a crosslinkable group or a substituent for connecting crosslinkable groups.

Specific examples of the radical polymerizable monomer C are exemplified below, but the compounds that can be used in the invention are not limited to those specific examples.

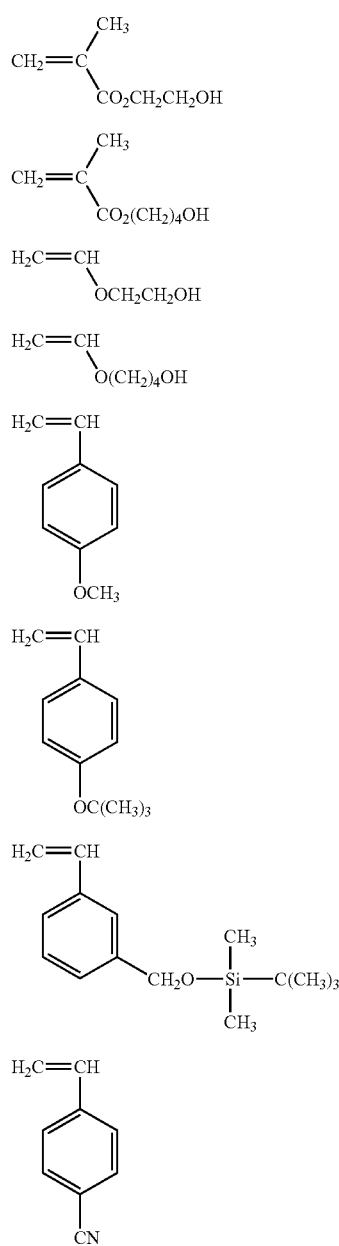

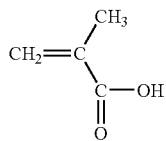

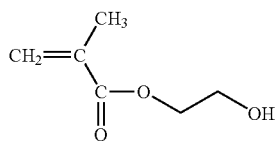

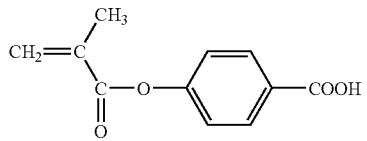

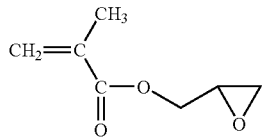

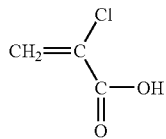

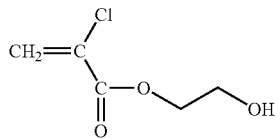

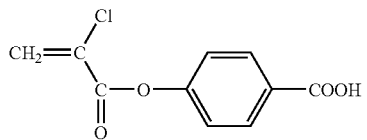

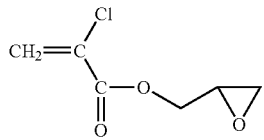

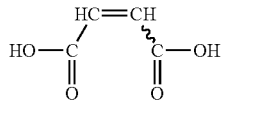

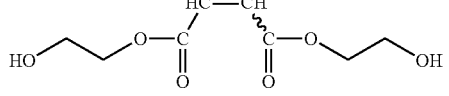

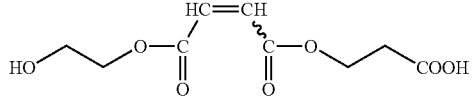

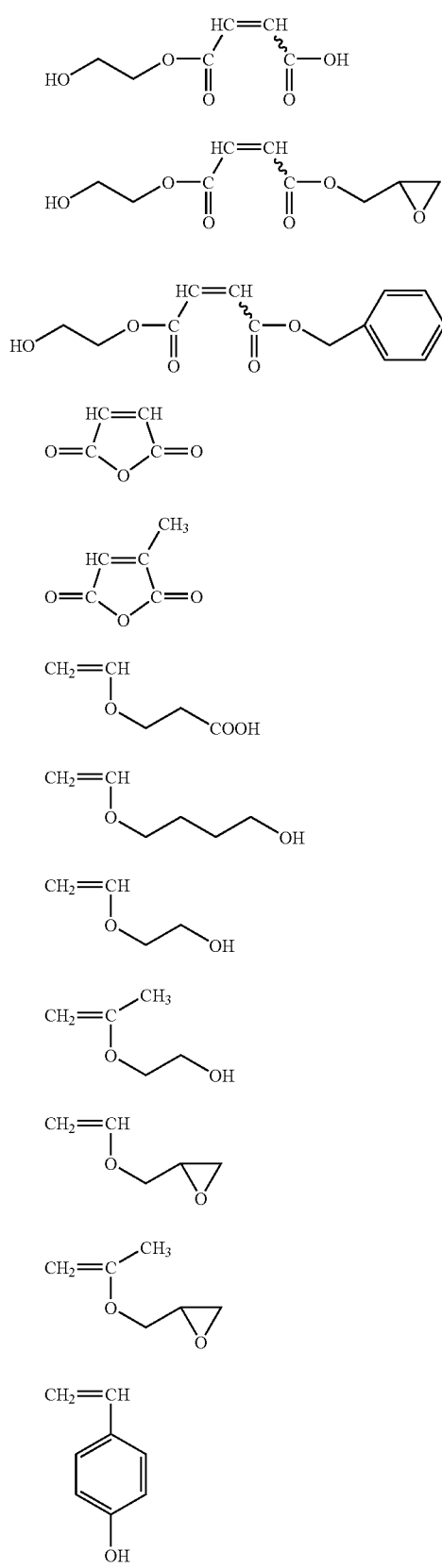
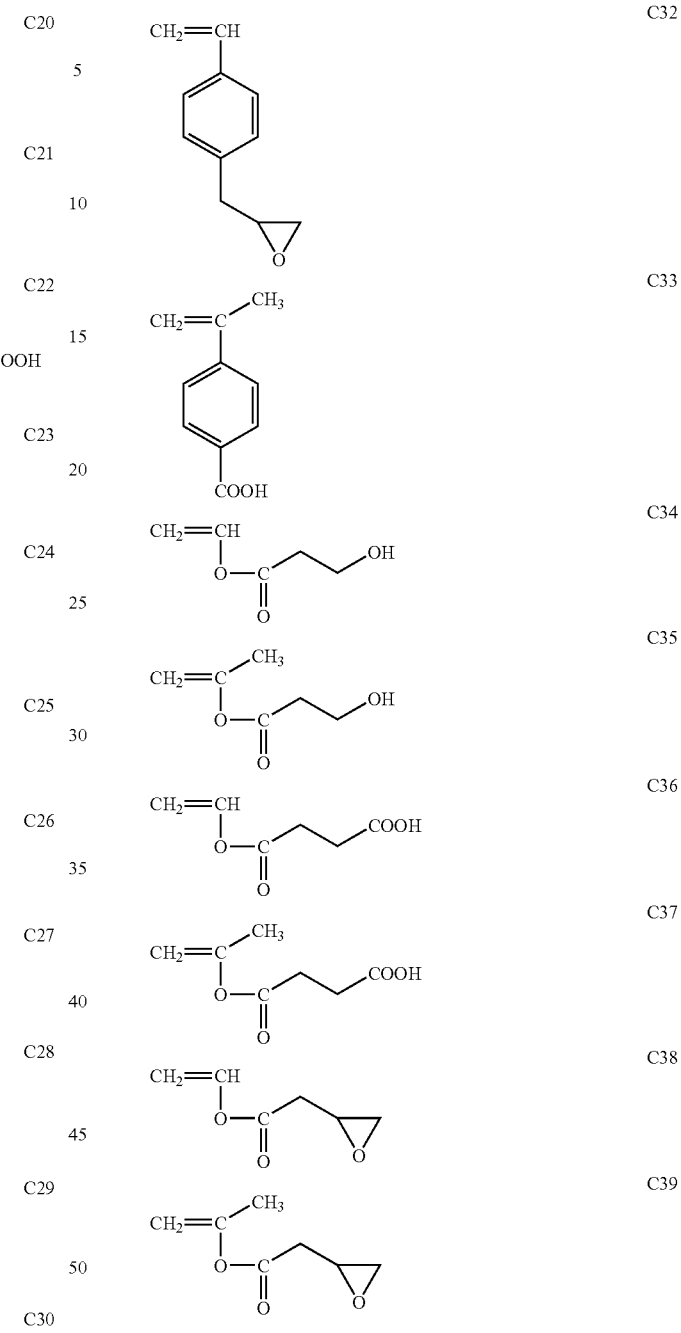

Polymerization reaction for obtaining the copolymer of the invention is preferably that a reaction solution obtained by the polymerization reaction can directly be used as a curing resin composition, and it is preferable to conduct the reaction in a solution polymerization system using an organic solvent. Examples of the preferable polymerization solvent include (1) esters such as ethyl acetate, butyl acetate, isopropyl acetate, isobutyl acetate and cellosolve acetate; (2) ketones such as acetone, methyl ethyl ketone, methyl isobutyl ketone and cyclohexane; (4) cyclic ethers such as tetrahydrofuran and dioxane; (4) amides such as N,N-dimethylformaldehyde and N,N-dimethylacetoamide; and (5) aromatic hydrocarbons such as toluene and xylene. Of those, esters, ketones and ethers are preferable. Ethyl acetate, acetone and methyl ethyl ketone, that do not have a high boiling point, and do not have load in drying, are particularly preferable. If necessary, alcohols, aliphatic hydrocarbons and the like can be used and mixed.

The copolymer of the invention may be obtained by appropriately subjecting the reaction solution obtained by polymerization reaction to a post-treatment. As the post-treatment, a general reprecipitation treatment (for example, a purification method of adding a polymerization reaction solution to an insolubilizing agent of a copolymer, comprising an alcohol, or the like, and insolubilization precipitating the copolymer) can be conducted, and subsequently, by dissolving the solid copolymer obtained in a solvent, a specific copolymer solution can be prepared. Further, the polymerization reaction solution from which residual monomers have been removed can directly be used as a specific copolymer solution.

Practically, the curing resin composition of the invention preferably has curing properties. Where the copolymer itself does not have sufficient curing properties, necessary curing properties may be imparted, or curing characteristics may be improved, by further adding various crosslinkable compounds, additives, polymerization initiators and the like, thereby forming a three-dimensional crosslinking structure or IPN (Inter Penetrating Network) structure. Where the crosslinkable compound is used, a mixture of the crosslinkable compound and the copolymer can be used as the curing resin composition, or a reaction product obtained by reacting the whole of the specific copolymer and crosslinkable compound, or a reaction product in a state that only a part of those has been reacted, can be used as the curing resin composition.

The curing resin composition used in the invention is preferably in a form of liquid, contains the copolymer of the invention and a solvent dissolving the same, as essential constituents, and is prepared by dissolving various crosslinking agents, additives and polymerization initiators according to need. In this case, concentration of the solid content is appropriately selected according to the use, but is preferably from 0.01 to 60 mass %, more preferably from 0.5 to 50 mass %, and further preferably from 1 to 20 mass %.

The solvent contained in the curing resin composition is not particularly limited so long as the composition containing the copolymer of the invention is uniformly dissolved or dispersed without generating precipitates. The solvent may be used as mixtures of two or more thereof. Examples of the preferable solvent include ketones (such as acetone, methyl ethyl ketone and methyl isobutyl ketone), esters (such as ethyl acetate and butyl acetate), ethers (such as tetrahydrofuran and 1,4-dioxane), alcohols (such as methanol, ethanol, isopropyl alcohol, butanol and ethylene glycol), and aromatic hydrocarbons (such as toluene and xylene). As described before, it is preferable that a reaction solution obtained by polymerization reaction can directly be used as the curing resin composition. Therefore, it is preferable that the polymerization catalyst further functions as the solvent contained the curing resin composition. It is more preferable that the reaction solution obtained by the polymerization reaction is further diluted with a suitable amount of the same kind of a solvent as the polymerization solvent, and is used.

If necessary, additives such as fine particles of silica or the like, various silane-coupling agents or their hydrolysis partial condensates, surfactants, thickening agents and leveling agents may appropriately be added to the curing resin composition.

Curing manners of the copolymer contained in the curing resin composition of the invention include the following three methods.

A first method is a manner of imparting a functional group such as a hydroxyl group or an amino group to a side chain of a copolymer, and reacting with a polyfunctional crosslinking agent such as a polyfunctional isocyanate to form a three-dimensional crosslinking structure, a second method is a manner of imparting a polymerizable group such as a (meth) acryloyl group to a side chain of a copolymer, and reacting with a polymerization initiator to form a three-dimensional crosslinking structure, and a third method is a manner of adding a compound having a monofunctional or polyfunctional polymerizable group to a copolymer, and polymerizing in a mixed state to cause interlocking of polymers with each other, although no direct bonding therebetween. Thus, curing characteristics are improved.

Those curing manners are specifically described below.

(1) The first manner is a curing resin composition comprising a combination of a polyfunctional crosslinking agent and a copolymer having a functional group reacting therewith. When the copolymer of the invention has a hydroxyl group at a side chain, the hydroxyl group at a side chain and the (polyfunctional) curing agent are reacted to cure. A method of introducing a hydroxyl group into the copolymer of the invention is preferably a method of introducing a hydroxyl group or a copolymer having a protected hydroxyl group into a side chain as one of copolymerizable components, and if necessary deprotecting.

On the other hand, the (polyfunctional) crosslinking agent used may be an oligomer or a polymer. Depending on the kind of the (polyfunctional) curing agent used, the curing manner can be classified into (I) a curing using an amino resin, (II) curing using a polyfunctional isocyanate, and (III) curing using a cationic polymerizable crosslinking agent. In the case of conducting curing by an amino resin as in (I), examples of the amino resin used include a urea resin, a melamine resin, a benzoguanamine resin and an acetoguanamine resin. The melamine resin is particularly preferable from the points of performances of a cured film and costs. In the case of conducting curing using a polyfunctional isocyanate as in (II), examples of the polyfunctional isocyanate used include triphenylmethane triisocyanate, toluylene diisocyanate, xylene diisocyanate and hexamethylene diisocyanate. Toluylene diisocynate is particularly preferable from the point of reactivity. In the case of conducting curing by a cationic polymerizable crosslinking agent as in (III), the crosslinking agent used preferably has a ring opening polymerizable group such as an epoxy group, an oxetanyl group and an oxazoline group, as a cationic polymerizable group. The crosslinking agent having an epoxy group is particularly preferable. Those crosslinking methods (I), (II) and (III) may be used alone or as combinations of two or three methods. The crosslinkable compound used in (I), (II) and (III) is not limited to the compounds shown herein, and crosslinking agents shown in, for example, Handbook of Crosslinking Agent, Taiseisha, may be used.

(2) The second method is a manner of imparting a polymerizable group such as a (meth)acryloyl group to a side chain of a copolymer, and reacting with a polymerization initiator to form a three-dimensional crosslinking structure. In the case that the structure of the copolymer is a fluorine-containing copolymer having a (meth) acryloyl group introduced into a side chain, curing is conducted by radical polymerization of the (meth) acryloyl group introduced. As the method of introducing the (meth)acryloyl group into the copolymer, the following (a) to (f) methods are preferable. That is, the methods are (a) a method of synthesizing a copolymer having a nucleophilic group such as a hydroxyl group or an amino group, and acting (meth)acrylic acid chloride, (meth)acrylic acid anhydride or a mixed acid anhydride of (meth)acrylic acid and methanesulfonic acid, (b) a method of acting (meth) acrylic acid to the copolymer having a nucleophilic group in the presence of a catalyst such as sulfuric acid, (c) a method of acting a compound having both an isocyanate group and a (meth) acryloyl group, such as methacryloyloxypropyl isocyanate, to the copolymer having a nucleophilic group, (d) a method of synthesizing a copolymer having an epoxy group, and acting (meth)acrylic acid, (e) a method of acting a compound having both an epoxy group and a (meth) acryloyl group, such as glycidyl methacrylate, to a copolymer having a carboxyl group, and (f) a method of polymerizing a vinyl monomer having a 3-chloropropionic acid ester site, and conducting dehydrochlorination. Of those, (a) or (b) is preferable to particularly a copolymer having a hydroxyl group.

The radical polymerization initiator can use either of an initiator generating radicals by the action of heat (thermal polymerization initiator) and an initiator generating radicals by the action of light (photopolymerization initiator).

(3) The third method is a manner of adding a compound having a monofuncional/polyfunctional polymerizable group to a copolymer, and polymerizing in a mixed state to cause interlocking of polymers with each other, although no direct bonding therebetween. The copolymer itself of the invention does not require introduction of a functional group as in (1) or (2). The copolymer is cured by adding a polymerizable compound having an ethylenically unsaturated group thereto, and irradiating with an active energy in the presence of a photopolymerization initiator or heating in the presence of a thermal polymerization initiator. The polymerizable compound used has preferably 2 or more, and more preferably 5 or more, ethylenically unsaturated groups in one molecule. Examples of the monomer having 2 or more ethylenically unsaturated groups include esters of a polyhydric alcohol and (meth) acrylic acid (for example, ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, and polyester polyacrylate), vinyl benzene and its derivatives (for example, 1,4-divinylbenzene, 4-vinylbenzoic acid-2-acryloylethyl ester and 1,4-divinylcyclohexane), vinylsulfones (for example, divinylsulfone), acrylamides (for example, methylenebisacrylamide) and methacrylamide. Those monomers may be used in two kinds or more.

In the above (2) or (3), when a compound initiating radical polymerization by the action of heat is used, curing of a film is conducted by heating. As such a thermal polymerization initiator, organic or inorganic peroxides, organoazo or diazo compounds, and the like can be used. Specifically, examples of the organic peroxide include benzoyl peroxide (BPO), tert-butylperoxy-2-ethyl hexanate (PBO), di-tert-butyl peroxide (PBD), tert-butylperoxyisopropyl carbonate (PBI) and n-butyl 4,4, bis(tert-butylperoxy)valarate (PHV), and examples of the azo compound include 2,2'-azobisisobutyronitrile, 2,2'-azobis(2-methylbutyronitrile), 1,1'-azobis(cyclohexane-1-carbonitrile), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate), di-tert-butyl-2,2'-azobis(2-methylpropionate) and 4,4-azobis(4-cyanopentanoic acid). The polymerization initiator may be used in two kinds or more.

When the curing is conducted by heat, the curing temperature is preferably from 30 to 200° C., more preferably from 80 to 180° C., and particularly preferably from 100 to 150° C. The heating time is preferably from 1 second to 100 hours, more preferably from 5 seconds to 20 hours, and particularly preferably from 10 seconds to 1 hour.

When a compound initiating radical polymerization by the action of light is used, curing of a film is conducted by irradiation with active energy rays. Examples of such a photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds. Examples of the acetophenones include 2,2-diethoxyacetophenone, p-dimethylacetophenone, 1-hydroxydimethylphenyl ketone, 1-hydroxycyclohexylphenyl ketone, 2-methyl-4-methylthio-2-morpholinopropiophenone and 2-benzyl-2-dimethylamino-1-(4-morpholinophenyl)-butanone. Example of the benzoins include benzoin benzenesulfonic acid ester, benzoin toluenesulfonic acid ester, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenyl phosphine oxide.

A photosensitizer may be used in addition to the photopolymerization initiator. Examples of the photosensitizer include n-butylamine, triethylamine, tri-n-butylphosphine, Michler's ketone and thioxanthone.

When curing is conducted by light, irradiation with active energy rays is preferably conducted using a high pressure mercury lamp or 365 mm LED. In this case, ultraviolet irradiation is conducted under the condition of oxygen concentration of preferably 0.5% or less, more preferably 0.3% or less, and particularly preferably 0.2% or less. Irradiation energy is in a range of preferably from 300 to 1,500 mJ/cm$^2$, more preferably from 400 to 1,000 mJ/cm$^2$, and particularly preferably from 500 to 800 mJ/cm$^2$.

The addition amount of the compound initiating radical polymerization by the action of heat or light is an amount that can initiate polymerization of carbon-carbon double bonds. In general, the amount is preferably from 0.1 to 15 mass %, more preferably from 0.5 to 10 mass %, and particularly preferably from 2 to 5 mass %, to the total solid contents in the curing resin composition.

The cured film made from the curing resin composition of the invention forms a low refractive index layer and also has mar resistance, and therefore can be extended to various optical material uses. For example, it can advantageously be used in formation of optical materials such as an antireflective film and optical fiber clad. Further, utilizing high fluorine content, it can suitably be used as materials for paint to a substrate requiring weatherability, materials for weatherable film, coating materials, and the like. Of those, use as an antireflective film is particularly useful, and when the film is applied to various displays, its visibility can be improved.

Application to an antireflective film having a low refractive index layer comprising the curing resin composition having the copolymer of the invention (sometimes referred to "low reflective laminate") is described in detail below. In particular, the copolymer of type B can preferably be employed to those uses.

Layer Structure of Antireflective Film

The antireflective film of the invention can have various layer structures, but has a layer structure comprising a transparent substrate, if necessary, a hard coat described hereinafter on the substrate, layers laminated thereon considering refractive index, film thickness, number of layers, order of layers, and the like, so as to decrease reflectivity by optical interference. The simplest structure of the low reflective laminate is a structure comprising a substrate and only a low refractive index layer formed thereon. To decrease the reflectivity, it is preferable that the antireflective layer is constituted by combining a high refractive index layer having a refractive index higher than that of the substrate and a low refractive index layer having a refractive index lower than that of the substrate.

Examples of the preferable layer structure of the antireflective film of the invention are shown below. In the following structures, the substrate film functions as a support.

Substrate film/low refractive index layer

Substrate film/antistatic layer/low refractive index layer

Substrate film/hard coat layer/high refractive index layer/low refractive index layer Substrate film/hard coat layer/antistatic layer/high refractive index layer/low refractive index layer Substrate film/hard coat layer/middle refractive index layer/high refractive index layer/low refractive index layer Substrate film/antistatic layer/hard coat layer/middle refractive index layer/high refractive index layer/low refractive index layer Antistatic layer/substrate film/hard coat layer/middle refractive index layer/high refractive index layer/low refractive index layer The layer structure is not particularly limited to those structures only so long as reflectivity can be decreased by optical interference.

The antistatic layer is preferably a layer containing conductive copolymer particles or metal oxide fine particles (for example, ATO and ITO), and can be formed by coating, atmospheric pressure plasma treatment or the like.

The above examples show a structural example of an antireflective film that does not have glare-proof property, but can preferably be applied to glare-proof, antireflective films. In this case, the glare-proof property can be imparted to any of the above layers.

High and Middle Refractive Index Layers

Materials for forming high and middle refractive index layers and hard coat layer in the antireflective film of the invention are described below.

The high and middle refractive index layers in the antireflective film of the invention has refractive index of preferably from 1.50 to 2.40, and more preferably from 1.50 to 1.80.

The high and middle refractive index layers of the invention contain at least a binder for forming a coating film, and can further contain an inorganic filler in order to increase refractive index of the layers and reduce curing shrinkage.

As the compound generating an acid by the action of light, various examples are described in, for example, Imaging Organic Materials, p 187-198, Organic Electronics Material Society, Bun-Shin Shuppan, and JP-A-10-282644, and those conventional compounds can be used. Specifically, examples of the compound include various onium salts such as a diazonium salt having $RSO_3$— (R represents an alkyl group or an aryl group), $AsF_6$—, $SbF_6$—, $PF_6$—, $BF_4$— or the like as a counter ion, an ammonium salt, a phosphonium salt, an iodonium salt, a sulfonium salt, a selenonium salt and an anthonium salt; organic halides such as oxadiazol derivatives in which a trihalomethyl group has be substituted, and S-triazine derivatives; o-nitrobenzne esters of an organic acid; benzoin esters; inimo esters; and disulfone compounds. Onium salts are preferable, and sulfonium salts and iodonium salts are particularly preferable.

The antireflective film of the invention preferably has a middle refractive index layer having a refractive index lower than that of the high refractive index layer and higher than that of the support. The middle reflective index layer can be formed in the same manner as in the high refractive index layer by controlling the amount of a high refractive index filler and a high refractive index monomer, used in the high refractive index layer.

The antireflective film may further have a hard coat layer, a moisture-proof layer, an antistatic layer, an undercoat layer or a protective layer. The hard coat layer is provided to impart mar resistance to a transparent support. The hard coat layer has a function to strengthen adhesion between the support and a layer thereon. The hard coat layer can be formed using an acrylic copolymer, a urethane copolymer, an epoxy copolymer, a silicone copolymer, a silica compound or the like. A pigment may be added to the hard coat layer. The acrylic copolymer is preferably synthesized by polymerization reaction of a polyfunctional acrylate monomer (for example, a polyol acrylate, a polyester acrylate, a urethane acrylate and an epoxy acrylate). A melamine polyurethane is included in the samples of the urethane copolymer. As the silicone copolymer, a cohydrolyzate of a silane compound (for example, a tetralkoxysilane and an alkyl trialkoxysilane) and a silane coupling agent having a reactive group (for example, epoxy and methcarylic) is preferably used. Two or more of the copolymers can be used in combination. As the silica compound, colloidal silica is preferably used. The hard coat layer has strength of preferably H or more, more preferably 2H or more, and most preferably 3H or more, in terms of a pencil hardness of 1 kg load. An adhesive layer, a shielding layer, a sliding layer or an antistatic layer may be provided on the support, in addition to the hard coat layer. The shielding layer is provided to shield electromagnetic waves or infrared rays.

The antireflective film of the invention is preferably used as a protective layer of a polarizing plate.

On the other hand, the copolymer A (preferably, copolymer AA) is preferable as a material of an optical member. Examples of the optical member containing the polymer of the invention include optical waveguides (particularly, optical fibers), lenses for still camera, video camera, telescope, eyeglass, plastic contact lens, sunlight collection or the like, mirrors such as concave mirrors or polygonal mirrors, and prisms such as pentaprisms. A polymer having very small birefringence can be obtained by selecting high heat resistance, high hygroscopic property and monomers. Therefore, it is possible to use the same in substrates such as a scattering plate or an optical disc, and an optical switch.

The embodiment that an optical fiber having a core portion and a clad portion is prepared is described below. Using a solution or a solid of the polymer, an optical fiber preform can be produced by, for example, the following methods ((1) is described in JP-A-11-109144 (page 7, Mode for Carrying Out the Invention)). However, the method is not limited to those methods.

(1) A method of producing a preform by melting a thermoplastic resin, pouring a melt of the polymer of the invention in the central portion thereof, further pouring a refractive index regulator or the polymer containing a refractive index regulator in the central portion thereof, and heat diffusing the refractive index regulator.

(2) A method of producing a preform by forming a tube comprising a hollow thermoplastic resin on the outermost layer utilizing a rotating glass tube or the like, pouring a solution of the polymer of the invention and a refractive index regulator in the hollow portion, evaporating an organic solvent to form a layer by reducing pressure or heating, while rotating, and simultaneously progressively increasing the amount of the refractive index regulator added.

(3) In the production methods of (1) and (2), a method of producing a preform without containing a refractive index regulator.

(4) A method of producing a hollow preform by forming a tube comprising a hollow thermoplastic resin on the outermost layer utilizing a rotating glass tube or the like, pouring a polymerizable composition (monomers, a polymerization initiator, a chain transfer agent if necessary, and a refractive index regulator if necessary) capable of producing the polymer of the invention (The thermoplastic resin is a polymer having a different refractive index, and the refractive index is preferably higher than the thermoplastic resin. Its refractive index is preferable 0.001 or higher, more preferably 0.005 or higher, and further preferably 0.01 or higher.) in the hollow portion, and polymerizing by heat or light.

(5) In (4), in producing a hollow preform of a rotating polymer having plural layers in a concentric fashion by polymerizing stepwise the polymerizable composition, a method of producing a preform by using a plural kinds of monomers having different refractive indexes, and progressively increasing their refractive indexes toward the center. In this case, the outermost thermoplastic resin layer is not essential.

The thermoplastic resin used in the above methods can be any thermoplastic resin so long as it imparts sufficiently high mechanical strength under use temperature of optical fibers. It is preferable to have tensile modulus at room temperature of 2,000 MPa or more. Of those, particularly representative examples include a polymethacrylate resin, a polycarbonate resin, a linear polyester resin, a polyamide resin, an acrylonitrile/styrene copolymer resin (AS resin), an acrylonitrile/butadiene/styrene copolymer resin (ABS resin), a polyacetal resin, a cyclic polyolefin resin, a polystyrene resin, a tetrafluoroethylene copolymer resin and a chlorotrifluoroethylene copolymer resin.

The refractive index regulator is called a dopant, and is a compound having refractive index different from the refractive index of the polymer or polymerizable monomer used. The refractive index is preferably 0.005 or higher. The dopant has the property to increase refractive index of a copolymer containing the same as compared with a copolymer not containing the same. As compared with the polymers formed by the synthesis of monomers, as described in U.S. Pat. No. 3,332,922 or JP-A-5-173026, those are that difference in solubility parameter is within 7 $(cal/cm^3)^{1/2}$, and difference in refractive index is 0.001 or more, and have the property to increase refractive index of a copolymer containing the same as compared with a copolymer not containing the same. Any compound that can stably be present together with the polymer, and is stable under polymerization conditions (polymerization conditions such as heating and pressurizing) of the polymerizable monomer as the above-described raw material can be used.

The dopant may be a polymerizable compound. When a polymerizable compound is used as the dopant, it is preferable to use a compound having the property that a polymer containing the same as a copolymerizing component increases its refractive index as compared with a polymer not containing the same. In the invention, a refractive index distribution type core portion may be formed by selecting plural kinds of monomers having different refractive indexes, and progressively changing its compositional ratio. Further, compounds that have the above properties, can stably be present together with the polymer, and is stable under polymerization conditions (polymerization conditions such as heating and pressurizing) of the polymerizable monomer as the above-described raw material can also be used as the dopant. By forming a refractive index distribution type core portion using the dopant, an optical member obtained is a refractive index distribution type plastic optical fiber having a wide transmission band.

Examples of the dopant include those disclosed in Japanese Patent No. 3332922 and JP-A-11-142657 such as benzyl benzoate (BEN), diphenyl sulfide (DPS), truphenyl phosphate (TPP), benzyl n-butylphthalate (BBP), diphenyl phthalate (DPP), biphenyl (DP), diphenylmethane (DPM), tricresyl phosphate (TCP), diphenyl sulfoxide (DPSO), diphenyl sulfide or its derivatives, bis(trimethylphenyl)sulfide, dithiane derivatives, bromobenzene, 1,2-dibromotetrafluorobenzene, 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene and bromheptafluoronaphthalene. Of those, BEN, DPS, TPP, DPSO, diphenyl sulfide and its derivatives, dithiane derivatives and bromobenzene are preferably used in the optical waveguide of the invention. Specific example of diphenyl sulfide and its derivatives, and dithiane derivatives are shown below. However, the invention is not limited to those.

Compounds in which hydrogen atoms present in those dopant compounds have been substituted with heavy hydrogen atoms can be used for the purpose of improving transparency in a wide transmission band. Further, polymerizable dopants such as tribromophenyl methacrylte can also be used. When the polymerizable compound is used as the dopant, a polymerizable monomer and a polymerizable refractive index regulating component are copolymerized in forming a matrix. Therefore, it is more difficult to control various characteristics (particularly, optical characteristics), but there is the possibility to be advantageous in the point of heat resistance.

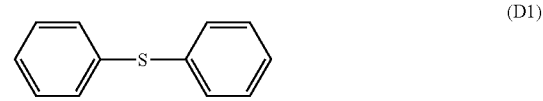

(D1)

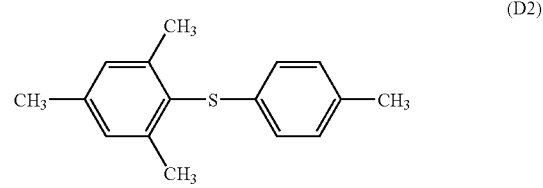

(D2)

-continued (D3) 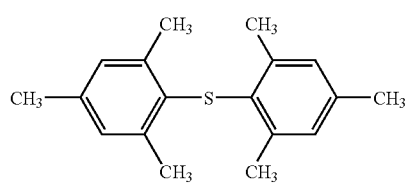

(D4) 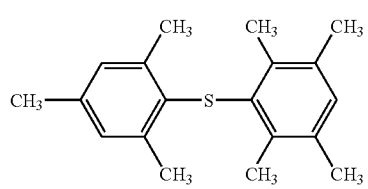

(D5) 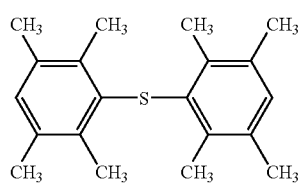

(D6) 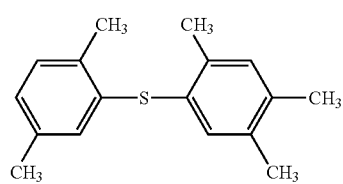

(D7) 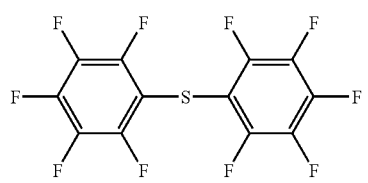

(D8) 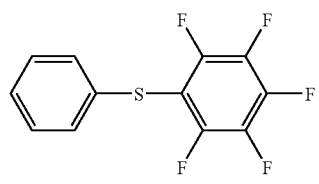

(D9) 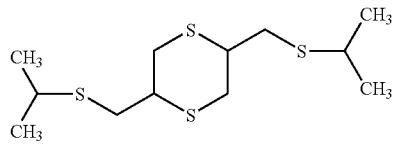

(D10) 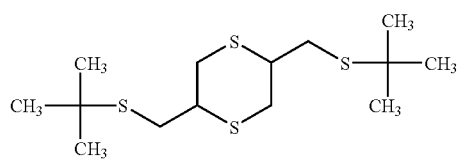

-continued (D11) 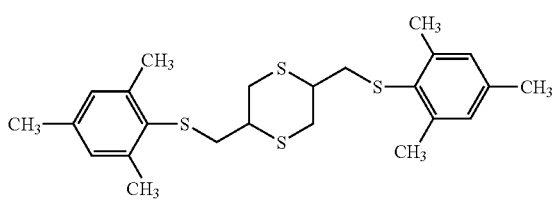

When the polymer of the invention is used in the core portion, a polymer having less C—H bonds is preferable, and a polymer in which C—H bonds are substituted with C-D bonds is preferable. By using the polymer in which C—H bonds are substituted with C-D bonds, transmission loss can further be decreased.

As the method of preparing the core portion having Graded-Index (GI) type refractive index distribution using the dopant and the polymer of the invention, the following methods (I) and (II) are preferable. However, the invention is not limited to those methods.

(I) A cylindrical molding a comprising a fluorine-containing polymer and a columnar molding b comprising the polymer of the invention containing a dopant are prepared by melt extrusion molding. The molding b is inserted in the molding a. By heating, the dopant in the molding b is melt dispersed to form GI type refractive index distribution. This method is one embodiment of the above method (1).

(II) A solution of a fluorine-containing polymer is poured in a cylindrical molding, and while rotating, pressure is reduced to remove a solvent, thereby a layer comprising the fluorine-containing polymer is formed on an inner surface of the cylindrical molding. A solution of a polymer containing a dopant is then poured, and while rotating, pressure is reduced to remove a solvent, thereby a layer comprising the copolymer containing a dopant is formed on an inner surface of the fluorine-containing polymer layer. While increasing the amount of the dopant added, the same operation as above is repeated to form plural layers, thereby imparting GI type refractive index distribution. This method is one embodiment of the above method (2).

(III) A polymerizable composition containing at least one compound represented by the formula (3), at least one compound represented by the formula (4), other monomers if necessary, and a dopant is poured in a cylindrical vessel such as a glass tube, and while rotating, a solvent is removed to form a layer. Using a polymerizable composition having different concentration of a dopant, this operation is repeated to form plural layers having a dopant concentration successively increasing toward the center from the outermost layer, thereby producing a hollow preform (PF). Alternatively, using at least two kinds of at least one of the compound represented by the formula (3) and the compound represented by the formula (4), polymerization is conducted while rotating to form a layer. Using a polymerizable composition having different compositional ratio of monomers, this operation is repeated to form plural layers having a copolymerization ratio of a monomer having high refractive index successively increasing toward the center from the outermost layer, thereby producing a hollow preform (PF).

Additionally, other additives can be added in a range of not decreasing optical transmission performance. For example, a stabilizer can be added for the purpose of improving weather resistance or durability. Further, a stimulated emission function compound for light signal amplification can be added for the purpose of improving optical transmission performance. By adding the above compound, an attenuated signal light can be amplified by excited light, thereby transmission distance is improved. Therefore, it can be used in, for example, a part of a light transmission link as a fiber amplifier. Those can be contained by polymerizing after adding the raw material monomers.

An optical fiber can be prepared by melt stretching the preform. Stretching is preferably conducted such that the preform is passed through the inside of a heating furnace (for example, a cylindrical heating furnace) or the like to heat and melt the same, and is then continuously stretch-spun. The heating temperature can appropriately be determined depending on the properties or the like of the preform, but is generally preferably from 180 to 250° C. The stretching conditions (stretching temperature and the like) can appropriately be determined, considering a diameter of a preform obtained, a diameter of a desired optical fiber, materials used, and the like. In particular, a refractive index distribution type optical fiber has a structure such that the refractive index changes from a central direction of its cross section toward the circumference thereof. Therefore, it is necessary to uniformly heat and stretch-spin so as not to destroy this distribution. Consequently, it is preferable for heating the preform to use, for example, a cylindrical heating furnace that can uniformly heat the perform in the cross-sectional direction. The heating furnace preferably has temperature distribution in a stretching axis direction. With narrowing the molten portion, the shape of refractive index distribution is difficult to distort, and yield increases, which is preferable. Specifically, it is preferable to conduct pre-heating and slow cooling before and after the molten region such that a region of the molten portion narrows. Further, a heat source that can supply high output energy even to a narrow region, such as laser, is more preferable as the heat source used in the molten region.

As described above, there is the case that a hollow preform is obtained depending on the production method of the preform. Where such a hollow preform is stretched, it is preferable to conduct the stretching under reduced pressure.

The stretching is preferably conducted using a stretch-spinning apparatus having a self centering mechanism maintaining a center position constant in order to maintain a linear form and its roundness. By selecting the stretching conditions, orientation of the polymer of fiber can be controlled, and mechanical properties (such as bending performance), heat shrinkage and the like of fibers obtained by drawing can be controlled. Tension at drawing can be 10 g or more in order to orient a molten plastic as described in JP-A-7-234322, or is preferably 100 g or less in order to not retain strain after melt stretching as described in JP-A-7-234324. Further, for example, a method of conducting a preheating step in stretching can be employed as described in JP-A-8-106015. Fibers obtained by the above methods can improve bending or lateral pressure characteristics of fibers by prescribing elongation at break or hardness of an element wire obtained as described in JP-A-7-244220. Further, as described in JP-A-8-54521, a low refractive index layer is provided on the outer circumference to function as a reflective layer, thereby transmission performance can further be improved.

It is preferable that transmission loss of the optical fiber of the invention is, for example, 150 dB/km at drying.

Further, it is preferable that loss increase at wet heating of the optical fiber of the invention is, for example, 15 dB/km or less under the conditions of 75° C. and 80% humidity.

The optical fiber produced by the above methods can be applied to various uses as it is. Further, the optical fiber can also be applied to various uses in an embodiment having a covering layer on the outside, an embodiment of having a fiber layer, and/or a state of bundling plural fibers. The covering step, for example, comprises passing a fiber element wire through facing dies having holes passing through the fiber element wire, filling a covering molten resin between the dies, and moving the fiber element wire between the dies, thereby obtaining a covered fiber. It is desirable that the covering layer does not weld with the fiber element wire in order to protect from stress to the inner fiber when bending. Further, in this case, because thermal damage is added to the fiber element wire when contacting with a molten resin, it is desirable to select a resin that can be melted at a moving speed suppressing the damage as possible, or low temperature. In this case, thickness of the covering layer depends on a melting temperature of a covering material, a drawing speed of an element wire and a cooling temperature of the covering layer. Besides, a method of polymerizing monomers applied to an optical member, a method of winding a sheet, a method of inserting an optical member in a hollow tube extrusion molded, and the like are known.

An optical fiber cable can be produced by covering the element wire. In such a case, the covering embodiment includes an adhesion type covering in which the optical fiber element wire is contacted and covered with the covering material over the entire circumference at the interface, and a loose type covering in which spaces are present between the covering material and the optical fiber element wire. In the loose type covering, for example, when the covering layer is peeled in connecting portion with a connector, there is the possibility that moisture permeates from the space at the edge, and diffuses in a longitudinal direction. Therefore, the adhesion type is generally preferable. However, in the case of the loose type covering, because the cover and the element wire are not adhered, many of damages including stress or heat applied to a cable can be relaxed by the covering material layer, and the damage applied to the element wire can be reduced. Therefore, the loose type covering can preferably be used depending on the purpose of use. Regarding propagation of moisture, the propagation of moisture from the edge can be prevented by filling gel-like semisolids or granular materials in the spaces, and by additionally making those semisolids or granular materials have a function different from moisture propagation prevention, such as heat resistance, improvement in mechanical performance, or the like, covering having high performance can be formed. To produce the loose type covering, a space layer can be formed by controlling the extrusion a nipple position at a cross head die and adjusting a pressure reducing device. Thickness of the space layer can be adjusted by thickness of the nipple and by pressuring or pressure-reducing the space layer.

If necessary, a further covering layer (secondary covering layer) may be provided on the outer circumference of the covering layer (primary covering layer). The secondary covering layer may contain a flame retardant, an ultraviolet absorber, an antioxidant, a radical trapping agent, a quencher, a lubricant and the like. Those can also be introduced into the primary covering layer so long as moisture-proof performance is satisfied. The flame retardant include a resin or additive containing a halogen such as bromine, and a material containing phosphor. It is a main trend to add a metal hydroxide as the flame retardant from the standpoint of safety such as toxic gas reduction. The metal hydroxide has moisture as water of crystallization in the inside thereof, and deposited water in the course of production of the same cannot be removed completely. Therefore, it is desirable that a flame retardant covering by the metal hydroxide is provided as an outer layer cover (secondary covering layer) of the moisture-proof covering (primary covering layer) of the invention. Further, to impart plural functions, a cover having various functions may be laminated. For example, other than the flame retardant as in the invention, a barrier layer for suppressing moisture absorption of an element wire or a hygroscopic material for removing moisture, such as a hydroscopic tape or a hygroscopic gel, can be provided in the covering layer or between the covering layers, or a buffer layer such as a flexible material layer or a foamed layer, for relaxing stress when bending, a reinforcing layer for increasing rigidity, and the like can be selected and provided, depending on the purpose of use. Where the thermoplastic resin contains, other than resins, a wire material such as a fiber having high elastic modulus (so-called high strength fiber) and/or a metal wire having high rigidity, and the like as a structural material, dynamic strength of a cable obtained can be reinforced, which is preferable. Examples of the high strength fiber include aramid fibers, polyester fibers and polyamide fibers. Examples of the metal wire include stainless steel wires, zinc alloy wires and copper wires. However, the invention is not limited to those examples. In addition, an outer sheath made of a metal pipe for cable protection, a supporting wire for overhead cable construction, and a mechanism for improving workability when wiring can be incorporated.

The cable may have any desired shape, depending on its use embodiment. For example, a bundle cable formed by concentrically bundling element wires, a tape cable formed by aligning them in lines, a covered cable formed by covering them with a presser coat or a wrapping sheath may be employed depending on the use of the cable.

As compared with the conventional optical fiber, the cable using the optical fiber of the invention has a broader latitude in axis shifting, and therefore, it may be butt-jointed. Preferably, however, an optical connector for joint is disposed at the end of the cable, and the cables are surely fixed and connected via the optical connector therebetween. The connector can utilize any known and commercially-available one, such as PN connectors, SMA connectors, SMI connectors, F05 connectors, MU connectors, FC connectors and SC connectors.

The system for transmitting optical signal using the optical fiber of the invention is constituted of an optical signal processor containing various optical members such as light emitter, light receiver, light switch, optical isolator, optical integrated circuit, and optical transmit-receive module. In this case, the optical fiber of the invention may be combined with any other optical fibers, and any known techniques relating to it may be employed. For example, reference may be made to *Base and Practice of Plastic Optical Fibers* (issued by NTS); and *Nikkei Electronics* 2001.12.3, pp. 110-127 "Optical Structure Mounted on Printed-Wiring Board, Now or Never". Combined with various techniques disclosed in these references, the invention may be favorably applied to light-transmission systems suitable to short-range appliances for high-speed large-capacity data communication and control with no influence of electromagnetic waves thereon, typically for example, in-unit wiring for computers and various digital instruments, in-unit wiring for vehicles and ships, optical linking for optical terminals to digital devices or digital devices to each other, and indoor or in-area optical LAN for houses, apartments, factories, offices, hospitals, schools.

Further, as combined with any of those described in *IEICE TRANS. ELECTRON.*, Vol. E84-C, No. 3, March 2001, pp. 339-344, "High-Uniformity Star Coupler Using Diffused Light Transmission", and *Journal of Electronics Packaging Society*, Vol. 3, No. 6, 2000, pp. 476-480 "Interconnection by Optical Sheet Bus Technique"; optical busses described in JP-A 10-123350, 2002-90571, 2001-290055; optical branching/coupling devices described in JP-A 2001-74971, 2000-329962, 2001-74966, 2001-74968, 2001-318263, 2001-311840; optical star couplers described in JP-A 2000-241655; optical signal transmission devices and optical data bus systems described in JP-A 2002-62457, 2002-101044, 2001-305395; optical signal processor described in JP-A 2002-23011; optical signal cross-connection systems described in JP-A 2001-86537; light transmission systems described in JP-A 2002-26815; multi-function systems described in JP-A. 2001-339554, 2001-339555; and also other various optical waveguides, optical branching filters, optical connectors, optical couplers, optical distributors, the invention may construct higher-level optical transmission systems for multi-transmit-receive communication. Apart from the above-mentioned light-transmission applications, the invention is also applicable to any other fields of lighting, energy transmission, illumination, and sensors.

EXAMPLES

The invention is described in more detail with reference to the following Examples, in which the material used, its amount and ratio, the details of the treatment and the treatment process may be suitably modified or changed not overstepping the sprit and the scope of the invention. Accordingly, the invention should not be limitatively interpreted by the Examples mentioned below.

(Average Molecular Weight)

Average molecular weight of a copolymer was measured with a gel permeation chromatography (GPC) by dissolving a part of a copolymer obtained in tetrahydrofuran (THF). Number average molecular weight (Mn) of a copolymer in the invention is a value when a polystyrene was used as a standard substance.

An apparatus used was HLC-8220 (a product of Tosoh Corporation), and a columns used was three columns of TSKgel Super HZM-H (4.6 mml. D.×15 cm), TSKgel Super HZ4000 (4.6 mml. D.×15 cm) and TSKgel Super HZ2000 (4.6 mml. D.×15 cm) that are connected.

Sample concentration was 2 mass %, inject amount was 10 μl, and flow rate was 0.35 ml/min. RI detector was used.

(Component Ratio)

Proportion (molar ratio) of each monomer constituting a copolymer was determined by an integrated value of $^1$H-NMR. Aceton-$d_6$ or THF-$d_8$ was used in the NMR analysis.

Glass Transition Temperature (Tg)

Measured by rising temperature at 10° C./min using a differential scanning calorimeter (part number: DSC 6200, a product of Seiko Instruments Inc.)

Tensile Test

A 200 μm thick polymer film was prepared from a powdery polymer after reprecipitation purification, using a high temperature press machine, a film of 100 mm×500 mm was cut off therefrom, and this cut piece was used as a test piece.

Using this test piece, elastic modulus and tensile strength at break was measured at a tensile rate of 3 mm/min and measurement temperature of 25° C. with Tensilon universal tester (part number RTC-1210A, a product of Orientec Co.).

(Refractive Index)

Using a refractometer (DR-M2, a product of ATAGO Co.), refractive index of a film test piece prepared above was measured at an observation wavelength of 589 nm and a measurement temperature of 25° C.

Cured films were evaluated by the following evaluation methods.

(Average Reflectivity)

Using a spectrophotometer (a product of JASCO Co.), spectroscopic reflectivity was measured in a wavelength region of from 380 to 780 nm at an incident angle of 5°. In Table 1 shown after, it was expressed as a mirror surface average reflectivity of from 450 to 650 nm.

(Pencil Hardness Evaluation)

An antireflective film was moistened at a temperature of 25° C. and a humidity of 60% RH for 2 hours, and pencil hardness evaluation was conducted according to JIS K5400.

(Mar Resistance Test)

Film surface was rubbed with steel wool #0000 under a load of 200 g 10 times, and level of mar generated was confirmed. Judgment was according to the following criteria.
Entirely no mar: ⊚
Slight mar: ○
Remarkable fine mar: Δ
Remarkable mar: X (Fingerprint Adhesion Evaluation)

It was employed as a measure of staining resistance of surface. An optical material was moistened at a temperature of 25° C. and a humidity of 60% RH for 2 hours, fingerprints was attached to a sample surface. The state when wiping off the fingerprints with a cleaning cloth was observed, and fingerprint adhesion was evaluated.
Fingerprint is completely wiped off: ⊚
Fingerprint remains slightly: ○
Fingerprint is not almost wiped off: X (White Haze Evaluation)

As a measure of evaluating crude density of inorganic fine particles in a low refractive index layer, a sample was placed on a black paper, and was irradiated with diffusion while light directly overhead at a distance of 50 cm. State of scattering unevenness of the sample was observed, and the following evaluation was made.

No unevenness and observed uniformly: ○
Scattering unevenness of white color is observed on a part of sample: Δ
Scattering unevenness of white color is observed on an entire surface of sample: X Monomer Synthesis Example 1

Synthesis of (3-1)

A solution of 37.0 g (0.370 mol) of 2,2,2-trifluoroethanol dissolved in 220 ml of ethyl acetate was ice cooled, and while stirring, 28.3 g (0.185 mol) of fumaroyl chloride was added dropwise to the solution while maintaining the inner temperature at 15° C. or lower. Subsequently, 47.8 g (0.370 mol) of ethyl diisopropylamine was added dropwise to the solution while maintaining the inner temperature at 15° C. or lower. After completion of the dropwise addition, the reaction liquid was poured in 400 ml of ice water, and 200 ml of ethyl acetate was added thereto. The resulting solution was transferred to a separatory funnel and was separated. An aqueous layer was removed, and an organic phase was washed with water, and then washed with a saturated sodium chloride aqueous solution. The solution was dried with anhydrous sodium sulfate, and a solvent was distilled off under reduced pressure. A crude product was purified with a silica gel chromatography (hexane ethyl acetate=20:1) to obtain 46.3 g (72%) of a white solid (3-1). The solid had a melting point of 46° C.

$^1$H-NMR (300 MHz, CDCl$_3$) data:

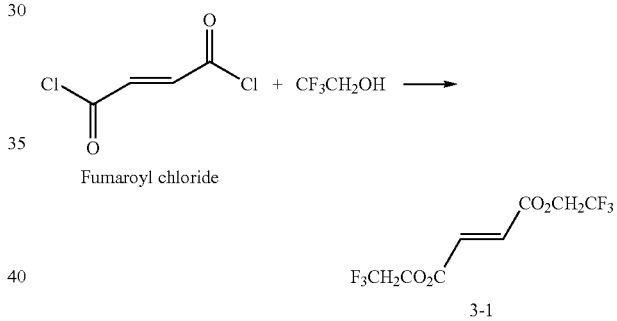

Monomer Synthesis Example 2

Synthesis of (3-3)

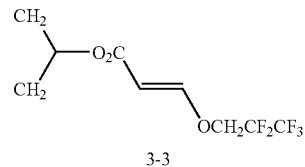

3-3

Synthesis of (3-3A)

98 g (1.00 mol) of maleic anhydride and 60.1 g (1.00 mol) of isopropyl alcohol were stirred under nitrogen atmosphere at a bath temperature of 110° C. (inner temperature: 70 to 95° C.) for 2 hours. A crude product was purified with distillation (4 mmHg, 115 to 119° C.) to obtain 109 g (69%) of a colorless transparent liquid (3-3A).

$^1$H-NMR data:

δ 1.34 (d, 6H), 5.19 (m, 1H), 6.41 (m, 2H)

Synthesis of (3-3)

200 ml of THF solution of 50.0 g (0.316 mol) of (3-3A) was ice cooled, and while stirring, 66.2 g (0.316 mol) of 2,6-dichlorobenzoyl chloride was added dropwise while maintaining an inner temperature at 10° C. or lower. Subsequently, 32.0 g (0.316 mol) of triethylamine was added dropwise while maintaining the inner temperature at 10° C. or lower, followed by stirring at room temperature for 1 hour. THF was distilled off under reduced pressure, and 150 ml of dichloromethane was added, and then again ice cooled. 55 g (0.37 mol) of 2,2,3,3,3-pentafluoropropanol was added, and 37.6 g (0.37 mol) of triethylamine was added dropwise while maintaining the inner temperature at 10° C. or lower, followed by stirring at room temperature for 1 hour. 150 ml of dichloromethane and 0.5 liter of 2N HCl were added to the reaction liquid to separate. An aqueous layer was removed, and an organic phase was washed with a saturated sodium chloride aqueous solution two times. The solution was dried with anhydrous sodium sulfate, and a solvent was distilled off under reduced pressure. 1.1 g (0.013 mol) of morpholine was added thereto, and stirred under nitrogen atmosphere for 1.5 hours. A crude product was purified with a silica gel chromatography (hexane/ethyl acetate=1/30), and then distilled (71 to 75° C./3 mmHg) to obtain 46.8 g (51%) of a colorless transparent liquid (3-3).

$^1$H-NMR data:

δ 1.31 (d, 6H), 4.75 (t, 2H), 5.13 (m, 1H), 6.89 (m, 2H)

Monomer Synthesis Example 3

Synthesis of (3-8)

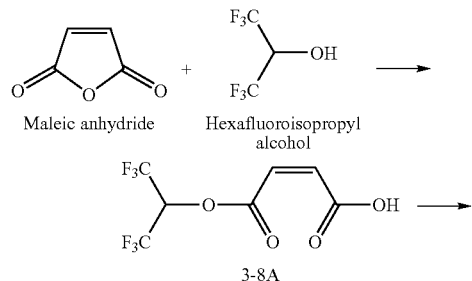

3-8

4.80 g (0.200 mol) of sodium hydride (a product of Aldrich, dry 95%) and 40 ml of dehydrated THF were placed in a 200 ml three-necked flask (hereinafter, the operation until the completion of stirring at temperature for 1 hour was conducted under nitrogen atmosphere), and ice cooled. While stirring, 60 ml of dehydrated THF solution of 37.2 g (0.221 mol) of hexafluoroisopropyl alcohol was added dropwise while maintaining a liquid temperature at 15° C. or lower, followed by stirring at room temperature for 1 hour.

This mixture was added to 200 ml of an ice cooled THF solution of 17.6 g (0.179 mol) of maleic anhydride while stirring under nitrogen atmosphere and maintaining the inner temperature at 15° C. or lower. After stirring at room temperature for 2 hours, the solution was poured in an ice-cooled 1N hydrochloric acid, and extracted with diisopropyl alcohol. An organic phase was washed with a saturated sodium chloride aqueous solution two times, and dried with anhydrous sodium sulfate. A solvent was distilled off under reduced pressure. A crude product was purified by recrystallization in hexane to obtain 33.2 g (62%) of a while solid (3-8A).

A mixture of 20 g (0.075 mol) of (3-8A), 10.7 g (0.090 mol) of thionyl chloride and 0.2 g of dimethylformamide (DMF) was stirred at 80° C. for 2 hour. After ice-cooling the reaction liquid, 120 ml of acetonitrile and 7.52 g (0.075 ml) of trifluoroethanol were added, and while maintaining the inner temperature at 15° C. or lower, 7.60 g (0.075 mol) of triethylamine was added dropwise, followed by stirring at room temperature for 1 hour. Ethyl acetate and diluted hydrochloric acid were added to the reaction liquid to separate. An organic phase was washed with a saturated sodium chloride aqueous solution two times. The solution was dried with anhydrous sodium sulfate, and a solvent was distilled off under reduced pressure. A crude product was purified with a silica gel chromatography (AcOEt/Hexane=1/30), and then distilled under reduced pressure (52° C./3 mmHg) to obtain 12.4 g (47%) of a colorless transparent liquid (3-8).

$^1$H-NMR data of (3-8) (300 MHz, CDCl$_3$):

δ 4.63 (q, 2H), 5.74 (m, 1H), 7.08 (m, 2H)

Example 1-1

Synthesis of Copolymer P-1-1

Synthesis was conducted using (3-1) and isopropenyl acetate (4-1).

(3-1) used was one synthesized by the above Monomer Synthesis Example. (4-1) used was one obtained by distilling a commercially available reagent, a product of Tokyo Kasei Kogyo Co. Dimethyl 2,2-azobis(2-methylpropionate) used was a commercially available reagent, a product of Wako Pure Chemical Industries, Ltd.

4.42 g (15.8 mmol) of (3-1) was placed in a 20 ml volume test tube, and heated to 50° C. to melt. 1.58 g (15.8 mmol) of (4-1) and 14.6 mg (0.064 mmol) of dimethyl 2,2-azobis(2-methylpropionate) were added to the test tube, followed by light shaking for mixing. After argon substitution, the test tube was sealed with a silicone plug, and was allowed to stand at 65° C. for 24 hours to conduct polymerization. The test tube was broken to obtain a rod-shaped polymer therefrom. The polymer was dissolved in THF, and the resulting solution was poured in methanol to conduct reprecipitation. A powder obtained was again dissolved in THF, and the resulting solution was poured in methanol to again conduct reprecipitation, followed by drying under reduced pressure, thereby obtaining 4.33 g. (72%) of a while powder. Compositional ratio (molar ratio) calculated from the integration value of $^1$H-NMR was (3-1) 45% and (4-1) 55%. Molecular weight was measured with GPC. Number average molecular weight was 177,000, and mass average molecular weight was 352,000.

This copolymer had Tg of 94° C., and a refractive index of 1.414.

This copolymer was dissolved in THF, and the resulting solution was applied to a slide glass. The resulting coating was heated to evaporate THF. A film thus obtained was completely transparent. Strength of a film prepared using a high temperature press machine was measured with Tensilon. As a result, the copolymer had elastic modulus of 1,650 MPa, and tensile strength of 34.7 MPa. Further, the copolymer had low hygroscopic property sufficient to use as an optical member.

Example 1-2

Synthesis of Copolymer P-1-2

Synthesis was conducted by using (3-2) as a monomer in place of (3-1).

Monomer (3-2) was synthesized in the same manner as (3-1) of Monomer Synthesis Example 1.

Polymerization was conducted in the same manner as in Example 1-1, except for using (3-2) in an equimolar amount in place of (3-1). Reprecipitation operation was conducted two times in the same manner as in Example 1-1 to obtain a while powder in a yield 63%. Compositional ratio (molar ratio) calculated from the integration value of $^1$H-NMR was (3-2) 42% and (4-1) 58%. Molecular weight was measured with GPC. Number average molecular weight was 205,000, and mass average molecular weight was 354,000.

This copolymer had Tg of 104° C., and a refractive index of 1.417.

This copolymer was dissolved in THF, and the resulting solution was applied to a slide glass. The resulting coating was heated to evaporate THF. A film thus obtained was completely transparent. Strength of a film prepared using a high temperature press machine was measured with Tensilon. As a result, the copolymer had elastic modulus of 1,710 MPa, and tensile strength of 37.3 MPa.

Example 1-3

Synthesis of Copolymer P-1-5

Synthesis was conducted in the same manner as in Example 1-1, except for using (3-8) in an amount equimolar with (3-1) in place of (3-1). Monomer (3-8) used was one obtained by the method described in Monomer Synthesis Example 2. Reprecipitation operation was conducted two times in the same manner as in Example 1-1 to obtain a while powder in a yield 63%. Compositional ratio (molar ratio) calculated from the integration value of $^1$H-NMR was (3-8) 44% and (4-1) 56%. Molecular weight was measured with GPC. Number average molecular weight was 115,000, and mass average molecular weight was 234,000.

This copolymer had Tg of 104° C., and a refractive index of 1.377.

This copolymer was dissolved in THF, and the resulting solution was applied to a slide glass. The resulting coating was heated to evaporate THF. A film thus obtained was completely transparent. Strength of a film prepared using a high temperature press machine was measured with Tensilon. As a result, the copolymer had elastic modulus of 1,200 MPa, and tensile strength of 29.0 MPa.

Comparative Example 1-1

Synthesis of Copolymer R-1 of Dicyclohexyl Fumarate and (4-1)

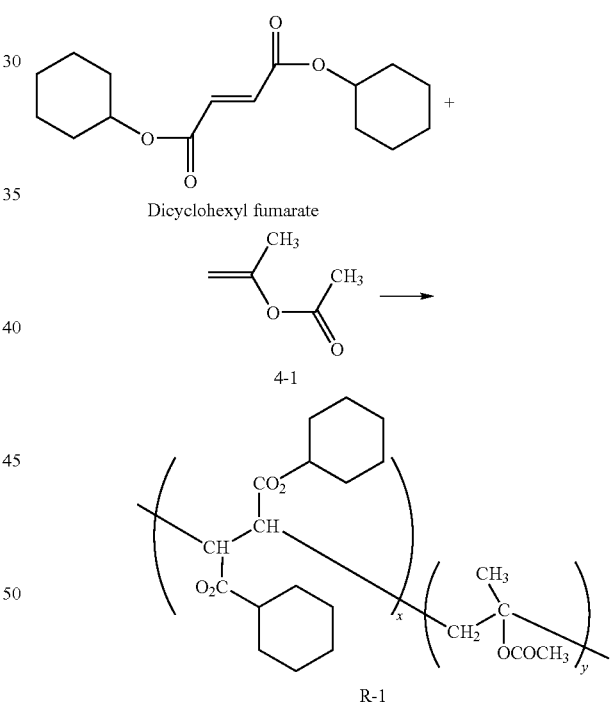

Dicyclohexyl fumarate was synthesized in the same manner as in (3-1) of Monomer Synthesis Example 1.

Polymerization was conducted in the same manner as in Example 1-1, except for using dicyclohexyl fumarate in an amount equimolar with (3-1). Reprecipitation operation was conducted two times in the same manner as in Example 1-1 to obtain a while powder in a yield 68%. Molecular weight was measured with GPC. Number average molecular weight was 102,000, and mass average molecular weight was 290,000.

This copolymer had Tg of 143° C.

Strength of a film prepared using a high temperature press machine was measured with Tensilon. As a result, the copolymer had elastic modulus of 1,220 MPa, and tensile strength of 10.5 MPa.

Comparative Example 1-2

Synthesis of Copolymer R-1 of (3-2) and Vinyl Acetate

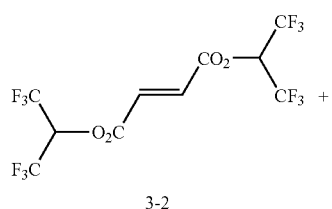

3-2 equimolar with (4-1) in place of (4-1). Vinyl acetate was used by distilling a commercially available reagent, a product of Wako Pure Chemical Industries, Ltd.

Reprecipitation operation was conducted two times in the same manner as in Example 1-1 to obtain a while powder in a yield 70%. Molecular weight was measured with GPC. Number average molecular weight was 53,000, and mass average molecular weight was 346,000. It was seen that the molecular weight distribution is wide as compared with P-1-1.

This copolymer had Tg of 65° C.

Strength of a film prepared using a high temperature press machine was measured with Tensilon. As a result, the copolymer had elastic modulus of 1,280 MPa, and tensile strength of 16.9 MPa.

Measurement results relating to polymers synthesized in Examples 1-1 to 1-3 and Comparative Examples 1 and 2 are shown in Table 1.

It is apparent that the polymer of the invention has narrow molecular weight distribution (Mw/Mn is about 2 or less), high Tg (90° C. or higher), and excellent mechanical properties, particularly tensile strength.

TABLE 1

|  | Polymer | Mw | Mn | Mw/Mn | Tg (° C.) | Elastic modulus (MPa) | Tensile strength (MPa) |
|---|---|---|---|---|---|---|---|
| Example 1-1 | P-1-1 | 352,000 | 177,000 | 2.0 | 94 | 1,650 | 34.7 |
| Example 1-2 | P-1-2 | 354,000 | 205,000 | 1.7 | 104 | 1,710 | 37.3 |
| Example 1-3 | P-1-5 | 234,000 | 115,000 | 2.0 | 104 | 1,200 | 29.0 |
| Comp. Example 1 | R-1 | 290,000 | 102,000 | 2.8 | 143 | 1,220 | 10.5 |
| Comp. Example 2 | R-2 | 346,000 | 53,000 | 6.5 | 65 | 1,280 | 16.9 |

Comp. Example: Comparative Example
Mw and Mn were rounded to the nearest thousand.

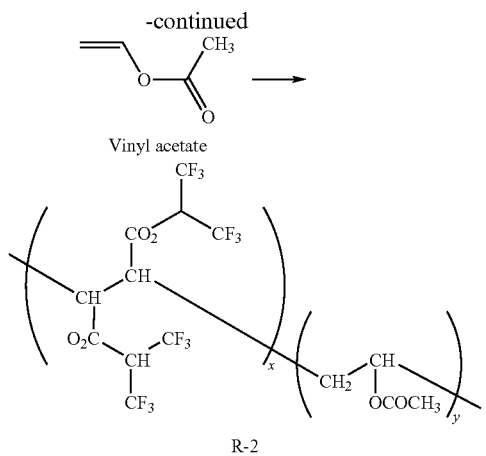

Polymerization was conducted in the same manner as in Example 1-1, except for using (3-2) in an amount equimolar with (3-1) in place of (3-1), and vinyl acetate in an amount Example 2-1

Synthesis of Fluorine-Containing Copolymer P-2-22 Having Hydroxyl Group at Side Chain 41.6 g (100 mmol) of (3-2), 9.0 g (90 mmol) of (4-1), 0.88 g (10 mmol) of (C-3), 2.0 g of an azo group-containing polydimethylsiloxane polymerization initiator VPS 1001 (a product of Wako Pure Chemical Industries, Ltd.) and 0.092 g (0.4 mmol) of dimethyl 2,2'-azobis(2-methylpropionate), V601 (a product of Wako Pure Chemical Industries, Ltd.) were placed in a 300 ml volume flask, and 50 g of methyl ethyl ketone was added thereto. After substituting with argon, solution polymerization was conducted at 65° C. for 24 hours. The copolymer solution obtained was directly poured in hexane, and reprecipitation purification was conducted two times to obtain 39.1 g of a fluorine-containing copolymer. The copolymer obtained had Tg of 102° C., a weight average molecular weight (Mw) of 58,000 and a refractive index of 1.385.

Example 2-2

Synthesis of Fluorine-Containing Copolymer P-2-24 Having Hydroxyl Group at Side Chain Example 2-1 was followed, except for changing (3-2) to (3-1) in an amount equimolar with (3-2), to obtain 30.2 g of a copolymer as a while powder. The copolymer obtained had Tg of 94° C., a weight average molecular weight (Mw) of 66,000 and a refractive index of 1.416.

Example 2-3

Preparation of Cured Film 1.5 g of a methoxylated methylmelamine, SYMEL 303, a product of Mitsui Cytec Co., as a curing agent was added to 100 g of MEK solution of 10 mass % of (P-2-22) obtained in Example 2-1, and heat reaction treatment was conducted at 70° C. for 5 hours. 0.1 g of p-tolynenesulfonic acid as a curing catalyst was added to the reaction mixture to prepare a low refractive index layer forming composition.

This low refractive index layer forming composition was diluted to a solid content of 6 mass %, and the resulting solution was applied to a substrate comprising a support (TAC, a product of Fuji Photo Film Co.) having formed thereon a hard coat layer (refractive index: 1.53) using a wire bar coater (#3). The resulting coating was heated at 120° C. for 60 minutes to form a cured film of 100 nm. The evaluation results are shown in Table 2.

Example 2-4

Preparation of Cured Film

A cured film was formed in the same manner as in Example 2-3, except for changing (P-2-22) to the same amount of (P-2-24). The evaluation results are shown in Table 1.

Comparative Example 2-1

A low refractive index layer forming composition was prepared in the same manner as in Example 2-3 described in JP-A-11-228631, and using this composition, a cured film was formed in the same manner as in Example 2-3. The evaluation results are shown in Table 2.

Example 2-5

Fluorine-Containing Copolymer Having Methacryloyl Group at Side Chain 20 g of the copolymer (P-2-22) obtained in Example 2-1 was dissolved in 100 ml of N,N-diemthyl acetamine, and after adding dropwise 5.0 g of methacryloyl chloride (a product of Wako Pure Chemical Industries, Ltd.) under ice cooling, the resulting mixture was stirred at room temperature for 10 hours. The mixture was extracted with ethyl acetate, and an organic phase was washed with water, and concentrated. Hexane was added for reprecipitation. The precipitate was further dissolved in THF, and reprecipitated with hexane, thereby obtaining 13 g of a fluorine-containing copolymer as a while powder. The copolymer had a weight average molecular weight (Mw) of 64,000, and a refractive index of 1.392.

Example 2-6

Fluorine-Containing Copolymer Having Methacryloyl Group at Side Chain

A fluorine-containing copolymer was synthesized in the same manner as in Example 2-5, except for changing (P-2-22) to the same weight of (P-2-24), thereby obtaining 13 g of a copolymer (while powder). The copolymer had a weight average molecular weight (Mw) of 61,000, and a refractive index of 1.421.

Example 2-7

0.5 g of Irgacure 907 (a product of Ciba Giegy) as a photopolymerization initiator was added to 100 g of MEK solution of 10 mass % of the copolymer obtained in Example 2-5 to obtain a low refractive index layer forming composition.

This low refractive index layer forming composition was diluted to a solid content of 6 mass %, and applied to a substrate comprising TAC having formed thereon a hard coat layer (refractive index: 1.53) having a thickness of 5 μm using a wire bar coater (#3), followed by drying at 80° C. for 1 minute. The resulting coating film was irradiated with ultraviolet rays under nitrogen atmosphere to form a cured film. The evaluation results are shown in Table 2.

Example 2-8

A cured film was formed in the same manner as in Example 2-7, except for changing the copolymer used to the copolymer obtained in Example 2-6. The evaluation results are shown in Table 1.

Comparative Example 2-2

A low refractive index layer forming composition was prepared in the same manner as in Reference Example 11 described in U.S. Pat. No. 3,498,381, and using the composition, a cured film was formed in the same manner as in Example 2-7. The evaluation results are shown in Table 2.

TABLE 2

| Antireflective film | Refractive index of low refractive index layer | Average Refractive index | Pencil hardness | Mar resistance | Fingerprint adhesion | White haze |
|---|---|---|---|---|---|---|
| Example 2-3 | 1.398 | 1.68 | 4H | ○ | ⊚ | ○ |
| Example 2-4 | 1.431 | 2.25 | 4H | ⊚ | ⊚ | ○ |
| Comparative Example 2-1 | 1.430 | 2.39 | 3H | X | ⊚ | ○ |
| Example 2-7 | 1.402 | 1.83 | 3H | ○ | ⊚ | ○ |
| Example 2-8 | 1.430 | 2.30 | H | ○ | ○ | ○ |
| Comparative Example 2-2 | 1.400 | 1.69 | H | X | ○ | ○ |

Example 3-1

Production Example of Optical Fiber (S-1) by Interfacial Gel Polymerization Using Polymer (P-1-4)

A hollow tube (one end was sealed with the same resin) having a thickness of 1 mm, an inner diameter of 22 mm and a length of 30 cm made of a polyvinylidene fluoride resin (refractive index: 1.38), previously prepared by melt extrusion molding was inserted in a stainless steel pipe, and was set to a rotation polymerization apparatus. Moisture, a polymerization inhibitor, (3-3) from which dusts were sufficiently removed, the equimolar (4-1), and 0.24% (weight ratio to the sum of monomers) of dimethyl 2,2'-azobisisobutyrate as a polymerization initiator were poured in the tube, and after substituting with nitrogen, the tube was in a sealed state. While rotating the pipe, polymerization was conducted at 65° C. for 3 hours, 70° C. for 2 hours, and 90° C. for 12 hours, to prepare an outer core portion (corresponding to an outermost layer) having a thickness of 4 mm.

Polymerization of an inner core portion was conducted as follows. The hollow tube having the outer core portion prepared was vertically placed in a pressure polymerization vessel heated to 80° C. (3-3) and (4-1) in equimolar amounts, and bromobenzene as a dopant were added so as to be an amount of 5% to the total weight of the monomers. 0.3% (weight ratio to the sum of the monomers) of di-tert-butyl peroxide as a polymerization initiator was added, followed by sufficient deaeration. The polymerizable composition heated to 80° C. was gently added to a hollow portion of the hollow tube. After substituting the inside of the pressure polymerization vessel with a nitrogen atmosphere, pressure was applied up to 0.2 MPa, and heat polymerization was conducted at 100° C. for 48 hours. While maintaining the pressured state, heat polymerization and heat treatment were conducted at 140° C. for 24 hours to obtain a preform.

The preform obtained above was melt stretched. The preform was inserted in a heating furnace controlled to 200 to 240° C. vertically downwardly. Stretching rate was controlled according to a diameter of a fiber measured through a fiber diameter measurement device so as to be the desired fiber outer diameter (300 µm). The fiber was primarily covered with a low density polyethylene, and then secondarily covered with a covering material comprising magnesium hydroxide kneaded with a nitrile butadiene rubber and a polyethylene. Refractive index in the sectional direction of the optical fiber preform was that a clad portion is 1.380 being constant, an outer core portion is 1.417 being constant, and an inner core portion is from 1.417 to 1.426 (central portion). The refractive index distribution of the inner core portion drew an upwardly convex parabola.

Transmission loss of the covered fiber obtained, and loss increase before and after placing the covered fiber in an atmosphere at 75° C. and 80% relative humidity for 240 hours are shown in Table 3.

Example 3-2

Production Example of Optical Fiber (S-2) Using (P-1-5)

A covered fiber was prepared in the same manner as in Example 3-1, except for changing the monomer used from (3-3) to (3-8). Refractive index in the sectional direction of the optical fiber preform was that a clad portion is 1.380 being constant, an outer core portion is 1.390 being constant, and an inner core portion is from 1.390 to 1.401 (central portion). The refractive index distribution of the inner core portion drew an upwardly convex parabola.

Transmission loss of the covered fiber obtained, and loss increase before and after placing the covered fiber in an atmosphere at 75° C. and 80% relative humidity for 240 hours are shown in Table 3. The evaluation results are summarized in Table 3.

Comparative Example 3-1

Production Example of Optical Fiber (R-1) Using Polymethyl Methacrylate (PMMA)

A covered fiber was prepared in the same manner as in Example 3-1, except for changing the monomer used to MMA (methyl methacrylate) and changing the dopant from bromobenzene to diphenyl sulfide (5% in weight ratio to MMA). The evaluation results are summarized in Table 3.

TABLE 3

|  | Monomer | Polymer | Transmission loss at drying (dB/km) | Loss increase value at moist-heat (dB/km) |
| --- | --- | --- | --- | --- |
| Example 3-1 | (3-3), (4-1) | P-1-4 | 130 | 15 |
| Example 3-2 | (3-8), (4-1) | P-1-5 | 110 | 12 |
| Comparative Example 3-1 | Methyl methacrylate | PMMA | 200 | 20 |

Transmission loss and loss increase value: 650 nm light source

INDUSTRIAL APPLICABILITY OF THE INVENTION

The copolymer of the invention has excellent transparency, has low hygroscopic property originated from fluorine atom, maintain heat resistance due to 1,2-diester structure, and gives good mechanical strength.

The copolymer of the invention and the curing resin composition containing the copolymer forms a good cured film having a sufficient low reflectivity, and the cured film has low refractive index and has excellent mar resistance. Therefore, the copolymer of the invention and the curing resin composition containing the copolymer can particularly advantageously be used for the formation of optical materials such as an antireflective film and an optical fiber clad material. Further, utilizing high fluorine content, those can suitably be used as paint materials to a substrate requiring weather resistance, weather-resistant film materials, coating materials, and the like. Further, the cured film has excellent adhesion to a substrate, in addition to low refractive index and excellent mar resistance, and gives good antireflective effect. Therefore, such a cured film is particularly useful as an antireflective film, and by applying the film to various displays, its visibility can be improved.

Additionally, the optical waveguide of the invention, particularly optical fibers (POF), is flexible and has low transmission loss by using, as its raw material, a polymer having good low hygroscopic property (moisture resistance), heat resistance (high Tg), mechanical strength (elastic modulus and tensile strength) and transparency, and capable of being easily produced.

The invention claimed is:

1. A copolymer containing a repeating unit represented by the following formula (1), and at least one of a repeating unit represented by the following formula (2-1) and a repeating unit represented by the following formula (2-2):

Formula (1)

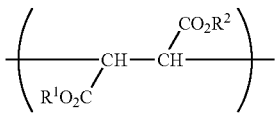

wherein $R^1$ and $R^2$ represent an alkyl group or an aryl group, provided that at least one of $R^1$ and $R^2$ contains a fluorine atom and $R^1$ and $R^2$ are not an alkyl group containing a group represented by $-(CX_2)_n-X$ in which X is a halogen atom and n is an integer of 7 or more, Formula (2-1)

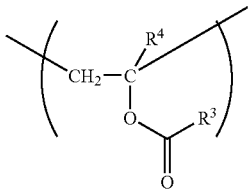

wherein $R^3$ represents an alkyl group, an aryl group, an alkoxy group or an amino group, and $R^4$ represents an alkyl group, Formula (2-2)

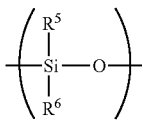

wherein $R^5$ and $R^6$ each represent a hydrogen atom, an alkyl group or an aryl group;
wherein the repeating unit represented by formula (2-2) is introduced by any one of methods (1), (2) or (3);
wherein,
method (1) is a method of introducing a fumarate having a siloxane unit represented by formula (6) as a monomer into a side chain, formula (6)

wherein,
at least one of $R^7$ and $R^8$ is a substituent represented by the following formula SU-1 formula SU-1

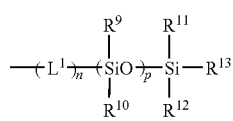

wherein,
$R^9$ to $R^{13}$ each represents a hydrogen atom, an alkyl group or an aryl group;
$L^1$ represents a connecting group having from 1 to 20 carbon atoms;

n is an integer of 0 or 1;
p is an integer from 30 to 500; and
when only one of $R^7$ and $R^8$ is SU-1, the other represents an alkyl group or an aryl group;
method (2) is a method of introducing into a side chain using a vinyl monomer having a siloxane unit, the vinyl monomer having a siloxane unit being at least one of a compound represented by formula (7), a compound represented by formula (8), or a compound represented by formula (9):

Formula (7)

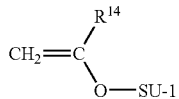

Formula (8)

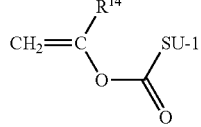

Formula (9)

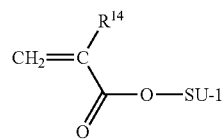

SU-1

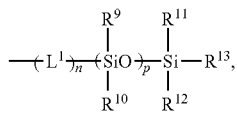

wherein $R^{14}$ represents a hydrogen atom, a methyl group or a trifluoromethyl group;
$R^9$ to $R^{13}$ each represents a hydrogen atom, an alkyl group or an aryl group;
$L^1$ represents a connecting group having from 1 to 20 carbon atoms;
n is an integer of 0 or 1; and
p is an integer from 30 to 500;
method (3) is a method of introducing into a main chain using an initiator having a siloxane unit-containing azo initiator having a repeating unit represented by formula (10):

Formula (10)

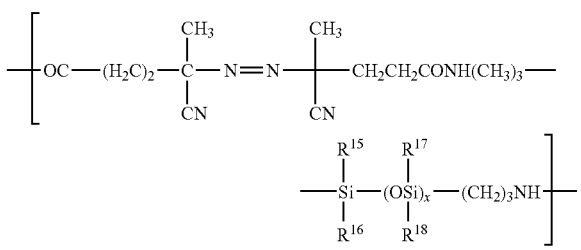

wherein,
$R^{15}$ to $R^{18}$ each represents an alkyl group or an aryl group; and
x is an integer of from 30 to 500.

2. The copolymer according to claim 1, containing the repeating unit represented by the formula (1) wherein at least one of $R^1$ and $R^2$ is an alkyl group having from 2 to 6 carbon atoms and a fluorine atom, or an aryl group containing a fluorine atom, and the repeating unit represented by the formula (2-1).

3. The copolymer according to claim 2, wherein $R^3$ and $R^4$ in the formula (2-1) are a methyl group.

4. The copolymer according to claim 1, containing the repeating unit represented by the formula (1) wherein at least one of $R^1$ and $R^2$ is an alkyl group having from 2 to 6 carbon atoms and a fluorine atom, and the repeating unit represented by the formula (2-1).

5. The copolymer according to claim 1, containing the repeating unit represented by the formula (1) and the repeating unit represented by the formula (2-1) in an amount of 30 mol % or more, respectively.

6. The copolymer according to claim 1, containing the repeating unit represented by the formula (1) and the repeating unit represented by the formula (2-2).

7. The copolymer according to claim 6, wherein at least one of $R^1$ and $R^2$ in the formula (1) is an alkyl group having from 2 to 6 carbon atoms and a fluorine atom, or an aryl group containing a fluorine atom.

8. A curing resin composition containing the copolymer according to claim 6, and a solvent.

9. The copolymer according to claim 6, wherein the repeating unit represented by formula (2-2) is introduced into a main chain according to method (3).

10. The copolymer according to claim 1, containing the repeating unit represented by the formula (1), the repeating unit represented by the formula (2-1) and the repeating unit represented by the formula (2-2).

11. The copolymer according to claim 10, containing 20 mol % or more of the repeating unit represented by the formula (1), 0.05 mol % or more of the repeating unit represented by the formula (2-2), and 20 mol % or more of the repeating unit represented by the formula (2-1).

12. The copolymer according to claim 10, wherein $R^3$ and $R^1$ in the formula (2-1) are a methyl group.

13. The copolymer according to claim 1, having a number average molecular weight (Mn) of from 1,000 to 1,000,000.

14. The copolymer according to claim 1, having a weight average molecular weight (Mw) of from 2,000 to 1,000,000.

15. The copolymer according to claim 1, having a weight average molecular weight/a number average molecular weight (Mw/Mn) of 2 or less.

16. A curing resin composition containing the copolymer according to claim 1, and a solvent.

17. A cured film made from the curing resin composition according to claim 16.

18. An antireflective film having a low refractive index layer comprising a cured film made from the curing resin composition according to claim 16.

19. A polarizing plate having a polarizer and a protective film provided on at least one side of the polarizer, the protective film being the antireflective film according to claim 18.

20. An image display having the antireflective film according to claim 18.

21. An optical waveguide containing the copolymer according to claim 1.

22. The optical waveguide according to claim 21, which is an optical fiber.

* * * * *